US012700432B2

(12) United States Patent
Graae et al.

(10) Patent No.: US 12,700,432 B2
(45) Date of Patent: Aug. 4, 2026

(54) MODULAR AND SYMMETRICAL DATA STORAGE UNIT

(71) Applicant: Sphere Entertainment Group, LLC, New York, NY (US)

(72) Inventors: Michael Graae, Brooklyn, NY (US); Deanan Dasilva, Malibu, CA (US); David Woods, Madison, WI (US)

(73) Assignee: SPHERE ENTERTAINMENT GROUP, LLC, New York, NY (US)

( * ) Notice: Subject to any disclaimer, the term of this patent is extended or adjusted under 35 U.S.C. 154(b) by 670 days.

(21) Appl. No.: 18/125,906

(22) Filed: Mar. 24, 2023

(65) Prior Publication Data

US 2024/0212722 A1     Jun. 27, 2024

Related U.S. Application Data

(60) Provisional application No. 63/476,569, filed on Dec. 21, 2022.

(51) Int. Cl.
*G11B 33/12* (2006.01)
*G11B 33/14* (2006.01)

(52) U.S. Cl.
CPC .......... *G11B 33/128* (2013.01); *G11B 33/142* (2013.01)

(58) Field of Classification Search
CPC ... G11B 33/128; G11B 33/142; G11B 33/124; G11B 33/1426
See application file for complete search history.

(56) References Cited

U.S. PATENT DOCUMENTS

| | | | | |
|---|---|---|---|---|
| 5,795,177 A * | 8/1998 | Hirono | ................. | G11B 33/126 |
| | | | | 439/378 |
| 6,145,037 A | 11/2000 | Sakakibara | | |
| 6,373,696 B1 * | 4/2002 | Bolognia | ............. | G11B 33/128 |
| 6,483,107 B1 * | 11/2002 | Rabinovitz | ............. | G06F 1/184 |
| 8,215,727 B2 * | 7/2012 | Barrall | ................. | G11B 33/128 |
| | | | | 312/319.1 |
| 8,369,040 B2 * | 2/2013 | Takamura | ............ | G11B 33/128 |
| | | | | 360/73.02 |
| 9,612,629 B2 * | 4/2017 | Hirano | ................. | G11B 33/148 |

(Continued)

FOREIGN PATENT DOCUMENTS

CN           113903372 A        1/2022

OTHER PUBLICATIONS

International Search Report and Written Opinion of the International Searching Authority directed to related International Patent Application No. PCT/US2023/084199, mailed Apr. 23, 2024; 14 pages.

*Primary Examiner* — Patrick H Mackey
(74) *Attorney, Agent, or Firm* — Sterne, Kessler, Goldstein & Fox P.L.L.C.

(57)              ABSTRACT
A data storage device can be symmetrically designed for multiple-orientation connection to a storage appliance. An electromagnetic locking mechanism can secure the data storage device in a connected state while data is being transferred to/from the data storage device. The electromagnetic locking mechanism can respond to changes in the state of data transfer to/from the data storage device. To facilitate increased bandwidth and capacity, the data storage device is optimally designed for increased thermal transfer from the device's memory to a finned housing comprising a material of substantial thermal mass.

23 Claims, 14 Drawing Sheets

(56)                References Cited

U.S. PATENT DOCUMENTS

| | | | |
|---|---|---|---|
| 2002/0141153 A1 | 10/2002 | Su | |
| 2015/0072540 A1* | 3/2015 | Sasaki .................. | G11B 33/128 |
| | | | 439/38 |
| 2015/0107099 A1* | 4/2015 | Sasaki .................. | G11B 33/127 |
| | | | 29/764 |
| 2017/0220506 A1* | 8/2017 | Brown ............... | G06F 13/4282 |

* cited by examiner

500

502

504

MODULAR AND SYMMETRICAL DATA STORAGE UNIT

CROSS-REFERENCE TO RELATED APPLICATIONS

The present application claims the benefit of U.S. Provisional Patent Appl. No. 63/476,569, filed Dec. 21, 2022, which is incorporated herein by reference in its entirety.

BACKGROUND

Recording visual media requires a data storage device capable of storing large amounts of data while maximizing data quality and continuity. While a camera may be capable of capturing exceptionally high-resolution image data, such data needs to be reliably stored for later access. If a data storage device cannot meet the demands of storing a large amount of data quickly and is susceptible to damage, recorded data can be lost. The internal attributes of a data storage device (e.g., its memory configuration, etc.) can impact its capacity, speed, and resilience to damage or data loss. In addition, the external attributes of a data storage device (e.g., its features enabling connection to another device, its cooling properties, etc.) can be important with respect to its capacity, speed, and resilience to damage or data loss.

Often, data storage devices and the data they contain can be damaged in the process of disconnection from or connection to another device. For example, a user can attempt to connect a data storage device in an incorrect orientation and damage the connector. This can cause the loss of the device and possibly data stored on the device. This typically requires a user to pay careful attention to the orientation of a data storage device before connecting it to another device, and can potentially delay the storage and access of data. In addition, a data storage device can be prematurely disconnected while data is being transferred to/from the data storage device. This can cause the corruption or loss of data. Additionally, data storage devices can be damaged due to heat caused by data transfer to/from the device.

BRIEF DESCRIPTION OF THE DRAWINGS/FIGURES

The accompanying drawings, which are incorporated herein and form a part of the specification, illustrate the present disclosure and, together with the description, further serve to explain the principals thereof and to enable a person skilled in the pertinent art to make and use the same. Aspects of the present disclosure are best understood from the following detailed description when read with the accompanying figures. It is noted that features are not drawn to scale. In fact, the dimensions of the features may be arbitrarily increased or reduced for clarity of discussion. In the drawings.

DETAILED DESCRIPTION

Figure 1:
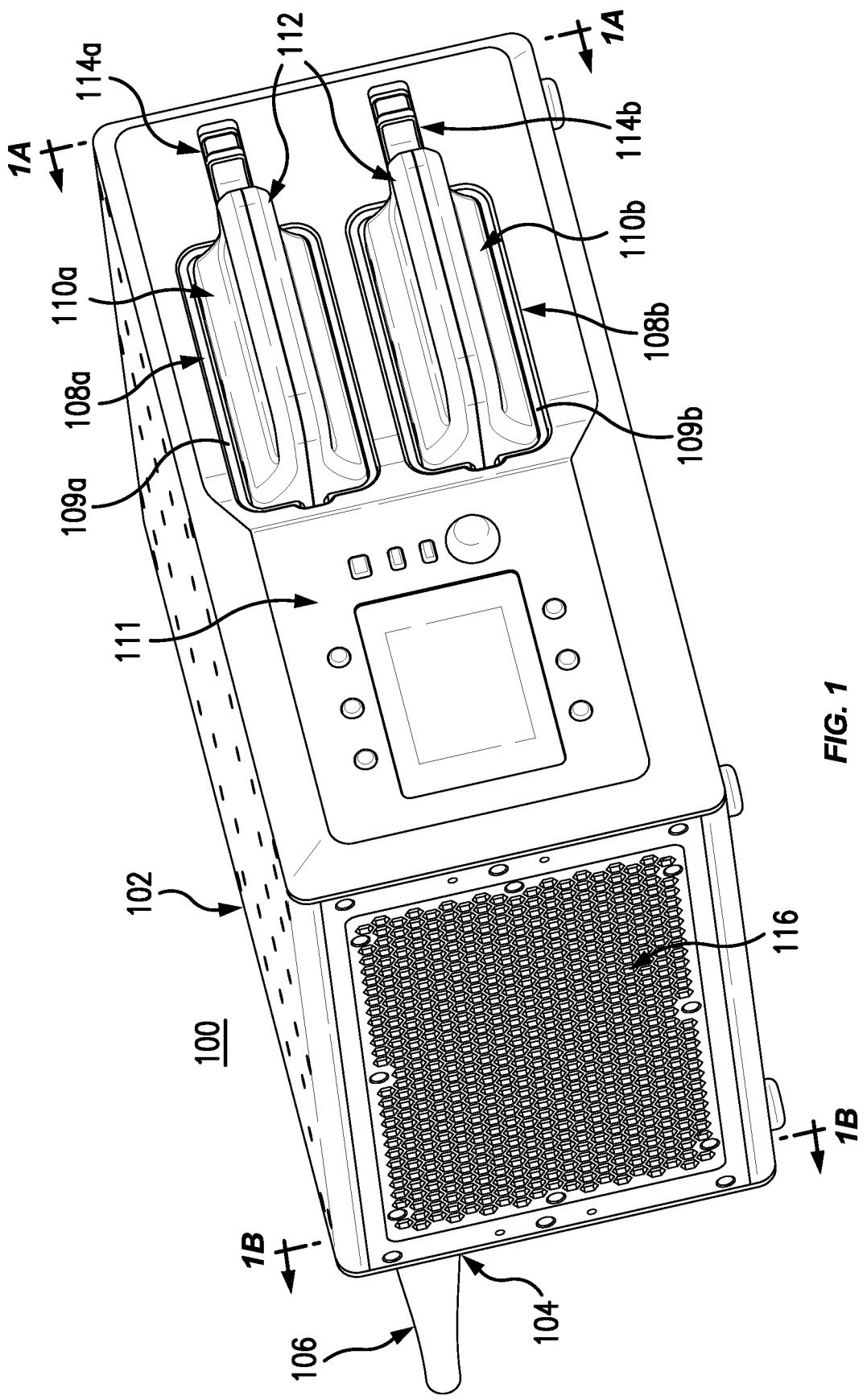
FIG. 1 is an orthographic view of a storage appliance in accordance with exemplary aspects of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows can include embodiments in which the first and second features are formed in direct contact, and can also include embodiments in which additional features can be formed between the first and second features, such that the first and second features may not be in direct contact. In addition, the present disclosure may repeat reference numerals and/or letters in the examples. This repetition does not in itself dictate a relationship between the embodiments and/or configurations discussed.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone, B alone, C alone, A and B in combination, A and C in combination, B and C in combination, or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point. In some embodiments, "about" may denote values within about 10% of a specified value, such as within about 5% of a specified value, or within about 2% of a specified value.

As used herein, the terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Data storage devices often require a single orientation for connection. The connector or connectors of the data storage device are often configured such that a user follows the orientation of the connector or connectors with respect to a complementary connector or connectors on the device to which the data storage device is being connected. Attempting to insert the connector or connectors of the data storage device into the complementary connector or connectors in an incorrect orientation can damage the connectors. Additionally, time is required to discern the correct orientation of the data storage device.

The data storage device of the present disclosure can implement a connector or connectors having multiple connection orientations for connection of the data storage device to another device. For example, the data storage device of the present disclosure can be connected in a first connection orientation and can be rotated 180 degrees about its z-axis (as defined in FIG. 3A and discussed below) to a second connection orientation. To facilitate multiple connection orientations, the housing of the data storage device can be symmetrical about the z-axis. The symmetrical configuration of the connector or connectors and housing of the data storage device can prevent damage caused by attempted connection in an incorrect orientation and can save time when inserting a data storage device.

The present disclosure can also include a mechanical locking mechanism controlled directly by a user. However, in addition, the present disclosure can include an electromagnetic locking mechanism responsive to the state of data transfer to/from a connected data storage device. The electromagnetic locking mechanism can engage when data is being transferred to/from a connected data storage device. The electromagnetic locking mechanism can disengage when data is not being transferred to/from a connected storage device. This functionality can prevent a user from disconnecting a data storage device while data is being transferred to/from the data storage device. Therefore, the electromagnetic locking mechanism described in the present disclosure can prevent data loss and damage due to premature disconnection of a data storage device.

The data storage device of the present disclosure can also implement a finned housing comprising a material with substantial thermal mass. This finned housing can form a heat sink that assists with the removal of excess heat from the data storage device. Additionally, the data storage device of the present disclosure can implement a thermally conductive material positioned near the memory. This material can assist with the dispersal of heat from around the memory into the finned housing. Additionally, the data storage device of the present disclosure can include drilled holes to increase the surface area of the data storage device, particularly around the memory, thus aiding heat dissipation. To complement these features, the data storage device of the present disclosure can be actively cooled by a fan.

FIG. 1 shows storage appliance 100, an example device for connecting and managing data storage devices. Storage appliance 100 can include a housing 102. In an embodiment, housing 102 can include a cable port 104 to connect to a cable 106. In an embodiment, cable 106 can be a fiber optic cable. Cable 106 can connect storage appliance 100 to a camera or other device to facilitate data transfer to and from storage appliance 100.

Housing 102 can include a slot to receive a removable data storage device (e.g., a removable memory magazine). For example, housing 102 can include a first slot 108a to receive a first memory magazine 110a. Housing 102 can also include a second slot 108b to receive a second memory magazine 110b. While FIG. 1 shows two slots, housing 102 can include additional slots to receive additional memory magazines, such as three slots, four slots, five slots, or six slots. When memory magazines 110 are inserted into slots 108 and connected to storage appliance 100, data can be transferred to/from memory magazines 110 using storage appliance 100.

Housing 102 can also include a status indicator to indicate the status of memory magazines 110. For example, housing 102 can include a first status indicator 109a adjacent to slot 108a and a second status indicator 109b adjacent to slot 108b. In an embodiment, status indicator 109a can surround the edge of slot 108a and status indicator 109b can surround the edge of slot 108b. In another embodiment, status indicator 109a can merely lie adjacent to slot 108a and status indicator 109b can merely lie adjacent to slot 108b. Status indicators 109 can visually depict the statuses of memory magazines 110 in slots 108. For example, status indicators 109 can depict that memory magazines 110 are connected and ready for data transfer, that data is being recorded to memory magazines 110, that data is being read from memory magazines 110, that data is being formatted on memory magazines 110, or that an error has occurred.

In an embodiment, status indicators 109 can comprise an LED or a plurality of LEDs. Status indicators 109 can further comprise opaque plastic behind which the LEDs are disposed. The LEDs can be multi-color, for example, RGB LEDs. Different colors can be used to indicate the statuses of connected memory magazines 110 (e.g., green—ready, red—recording, white—reading, blue—formatting, yellow—error, no light—disconnected).

In the case of housing 102 including two slots 108 to receive two memory magazines 110 connected to storage appliance 100, data can be transferred to/from a single memory magazine at a time or both memory magazines simultaneously. For example, data can be transferred to/from memory magazine 110a and not memory magazine 110b. Alternatively, data can be transferred to/from memory magazines 110a and 110b simultaneously.

In the case of data being transferred with a single memory magazine at a time, a user can maintain continuous storing and/or accessing of data by replacing a memory magazine 110 that is not in use. For example, a memory magazine 110 that has become full and/or whose data has been fully accessed can be replaced with a new memory magazine 110. Before the memory magazine 110 is replaced, storage appliance 100 can stop transferring data to the memory magazine 110 and can begin transferring data to the other memory magazine 110. For example, if data is being stored on memory magazine 110b and memory magazine 110b runs out of available memory capacity, the storing of data can be switched to memory magazine 110a. A user can then replace memory magazine 110b with a new memory magazine. When memory magazine 110a becomes full, the storing of data can be switched to the new memory magazine inserted in place of 110b.

In the case of data being transferred to/from both memory magazines 110 simultaneously, additional functions can be performed. For example, data can be accessed from both memory magazine 110a and memory magazine 110b simultaneously. This can allow larger amounts of data to be accessed at once. This function can also be useful when each of memory magazines 110 holds a fraction of a particular collection of data necessary to render the collection of data.

In addition, a backup function can be performed. For example, data can be duplicated by storing it on both memory magazine 110a and memory magazine 110b. The use of more than one memory magazine to store duplicate data can increase fault tolerance by mitigating or preventing loss of data should a single memory magazine experience damage and/or data corruption.

Additional variations of data reading/writing can be implemented. For example, since data can be simultaneously stored on and accessed from a memory magazine 110, data can be simultaneously stored on and accessed from each of memory magazine 110a and memory magazine 110b. Further, data can be simultaneously stored on memory magazine 110a and accessed from memory magazine 110b, or vice-versa.

In an embodiment, a user can implement a first low-capacity, high-bandwidth memory magazine and a second high-capacity, lower-bandwidth memory magazine for backing up the data stored on the first low-capacity, high-bandwidth memory magazine. For example, memory magazine 110a can be a low-capacity, high-bandwidth memory magazine and memory magazine 110b can be a high-capacity, lower-bandwidth memory magazine. Data stored on memory magazine 110a can be duplicated on memory magazine 110b. Duplication of data stored on memory magazine 110a can be in real time or after the data has been stored on memory magazine 110a. While this example discusses only two memory magazines 110a and 110b, it is understood that the greater memory capacity of memory magazine 110b predicts memory magazine 110a can be replaced by another memory magazine while memory magazine 110b remains connected to storage appliance 100. This diversity in memory configurations can secure benefits in addition to fault tolerance, such additional benefits being discussed below with respect to FIG. 3D. The configurations of memory within memory magazines 110 that can be implemented to produce low- and high-capacity memory magazines used as described above will also be discussed.

In the case of housing 102 including more than two slots 108 to receive more than two memory magazines 110 connected to storage appliance 100, data can be transferred to/from a subset (including a single memory magazine) of memory magazines 110 simultaneously or all memory magazines 110 simultaneously.

In the case of data being transferred to/from a subset of all memory magazines 110 connected to storage appliance 100 simultaneously, a user can maintain continuous storing and/or accessing of data by switching out memory magazines 110 that have become full and/or whose data have been fully accessed with new memory magazines 110. Before the fully utilized memory magazines 110 have been replaced, the storing and/or accessing of data can be transferred from the fully utilized memory magazines 110 to other memory magazines 110 connected to storage appliance 100 as soon as the fully utilized memory magazines 110 become fully utilized. The storing and/or accessing of data can then be transferred back to the newly connected memory magazines 110 when the other memory magazines 110 connected to storage appliance 100 are fully utilized.

Accessing data from multiple memory magazines simultaneously can be implemented as discussed above for the two memory magazine case, with the same benefit of allowing larger amounts of data to be accessed at once. This function can also be useful when each of memory magazines 110 (or each of a subset of memory magazines 110) holds a fraction of a particular collection of data necessary to render the collection of data.

In addition, using a subset of memory magazines 110 for data backup can be implemented as described above for the two memory magazine aspect, with the same benefit of increased fault tolerance associated with storing duplicate data on more than one memory magazine.

Additional variations of data reading/writing can be implemented. For example, since data can be simultaneously stored on and accessed from a memory magazine 110, data can be simultaneously stored on and accessed from each of a subset of or all memory magazines 110. Further, data can be simultaneously stored on a subset of memory magazines 110 and accessed from another subset of memory magazines 110.

Figure 3A:
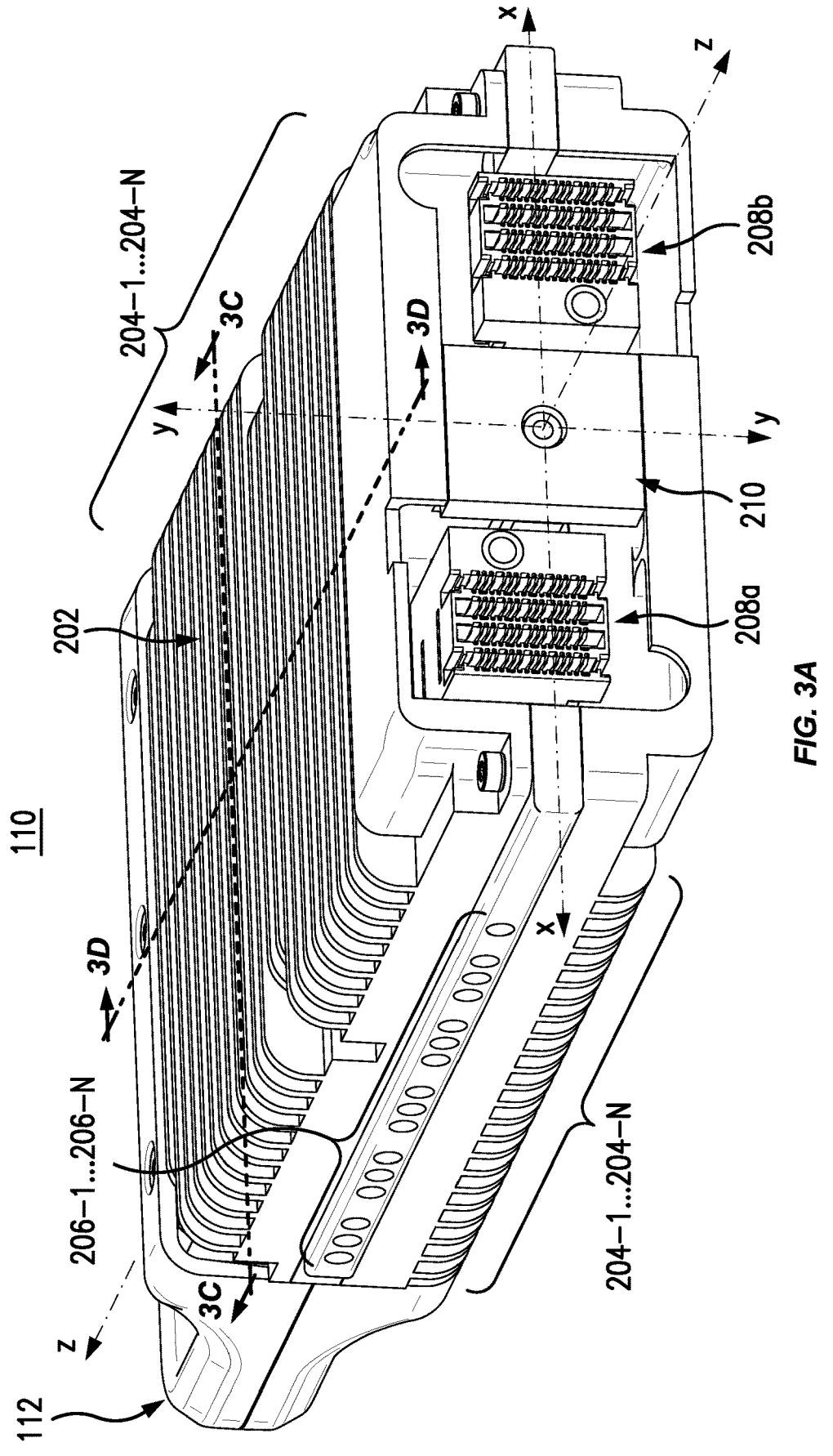
FIGS. 3A-3B are orthographic views of a memory magazine in accordance with exemplary aspects of the present disclosure.
Figure 3B:
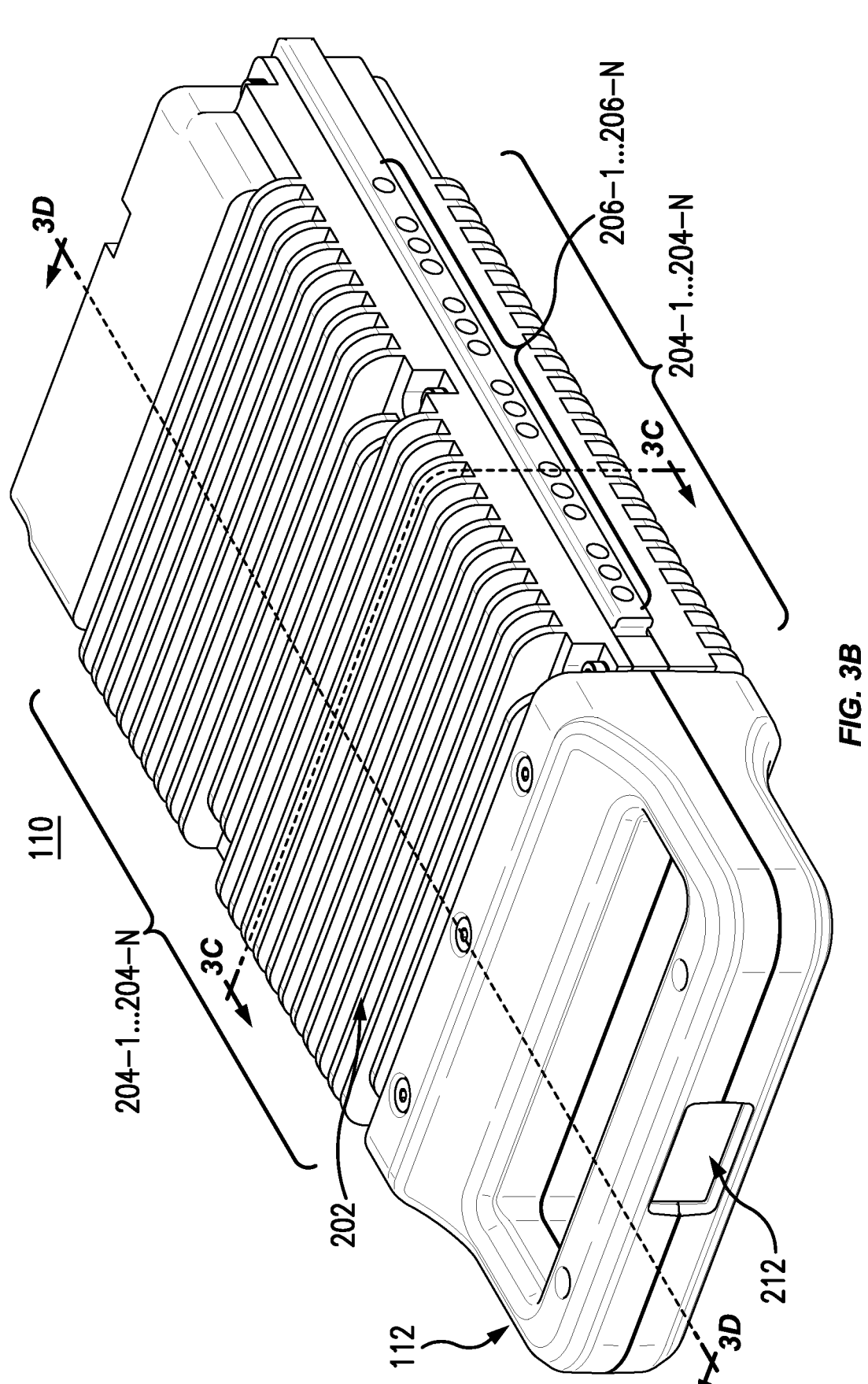
Figure 3C:
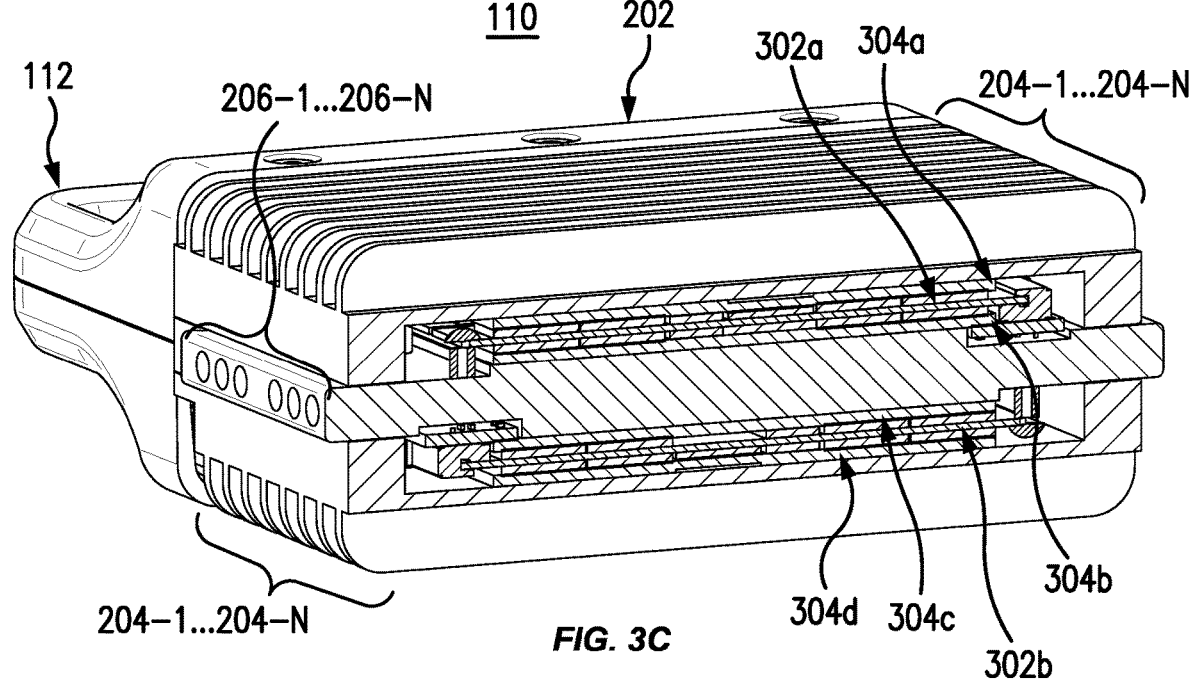
FIG. 3C is a section view of the memory magazine shown in FIGS. 3A-3B along line 3C-3C in accordance with exemplary aspects of the present disclosure.
Figure 3D:
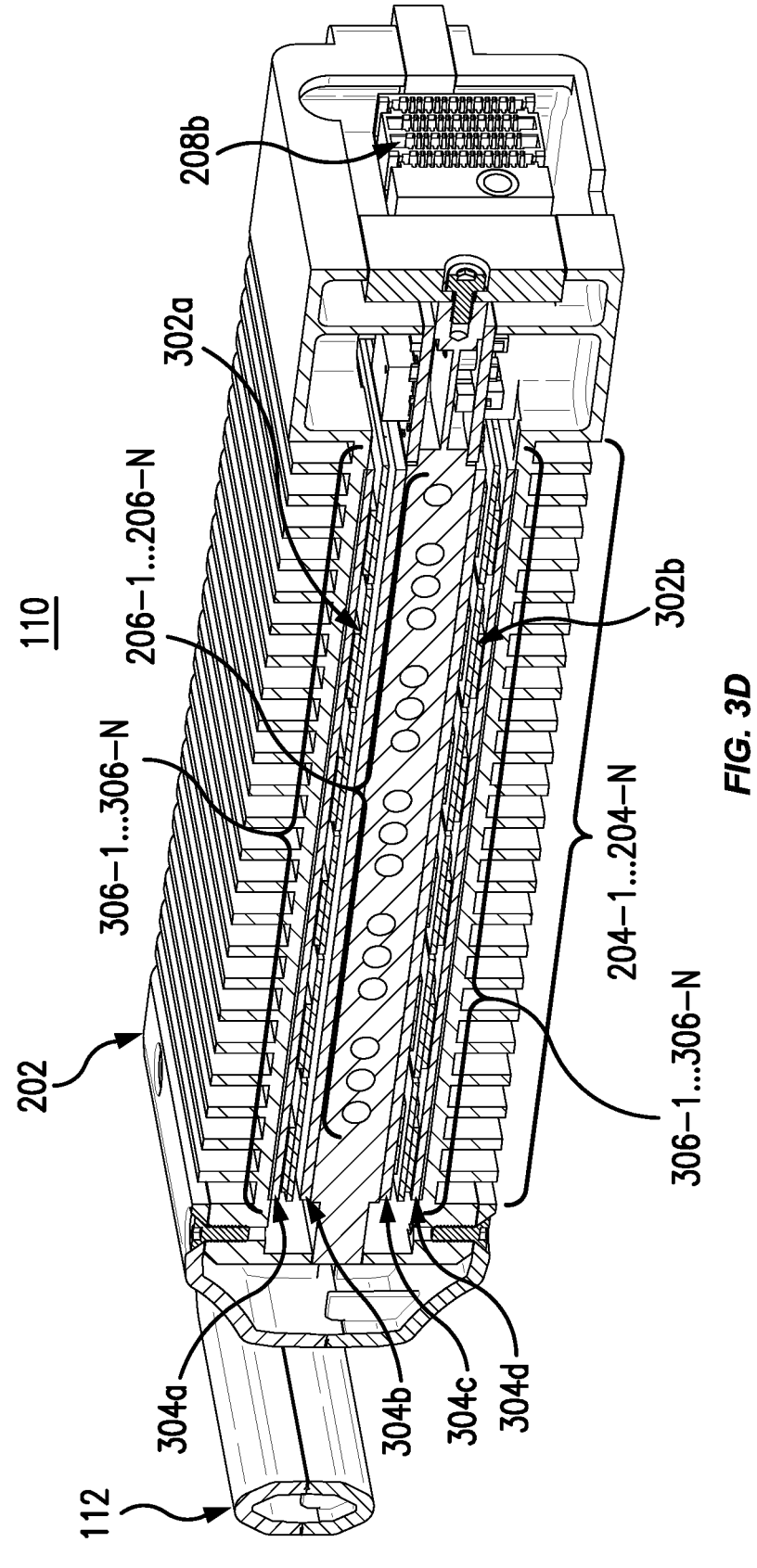
FIG. 3D is a section view of the memory magazine shown in FIGS. 3A-3B along line 3D-3D in accordance with exemplary aspects of the present disclosure.

Furthermore, using a first subset of low-capacity, high-bandwidth memory magazines for storing data and a second subset of high-capacity, lower-bandwidth memory magazines for backing up data stored on the first subset of low-capacity, high-bandwidth memory magazines can be implemented as described above for the two memory magazine case, with the same benefit of increased fault tolerance associated with storing duplicate data on more than one memory magazine and the additional benefits discussed below with respect to FIG. 3D.

The composition of memory on memory magazines 110 can influence which of memory magazines 110 are selected for data transfer at a given time, given the effects of composition on bandwidth and memory capacity. For the same reason, the composition of memory magazines 110 can influence what types of data are transferred to selected memory magazines at a given time. The process by which particular memory magazines can be selected for data transfer will be discussed in further detail below with respect to FIGS. 3D and 5.

Storage appliance 100 can also include a user interface 111. User interface 111 can be incorporated into housing 102. User interface 111 can receive and display information, for example, which of slots 108 holds connected memory magazines, the available memory capacity of each connected memory magazine, the fraction of stored data read from each connected memory magazine, and/or the status of data transfer to/from each connected memory magazine. In an embodiment, user interface 111 can be an e-ink display viewable when power is not supplied to storage appliance 100. In another embodiment, user interface 111 can be a liquid crystal display (LCD), such as an LED display.

A user can control which of memory magazines 110 to transfer data to/from via user interface 111. Employing user interface 111, a user can choose to select one of memory magazines 110 for data transfer. When a user selects one of memory magazines 110 for data transfer, data can begin to be transferred to/from the selected memory magazine. Employing user interface 111, a user can also choose to eject one of memory magazines 110. When a user chooses to eject one of memory magazines 110 via user interface 111, data can cease to be transferred to/from the memory magazine to be ejected. This process will be described in more detail with respect to FIG. 7.

Memory magazines 110 can include a handle 112 to allow a user to more easily grip the memory magazine 110 for insertion into and removal from storage appliance 100. For example, memory magazine 110*a* can include a first handle 112 and memory magazine 110*b* can include a second handle 112. In embodiments, handle 112 can be an extruded pull handle or an extruded ledge handle. In other embodiments, handle 112 can be other forms of protrusions, which allow a user to more easily grip memory magazine 110. Handle 112 can be integrally formed in or attached to memory magazine 110.

Housing 102 can also include a locking mechanism to secure a memory magazine in a connected state. For example, a first locking mechanism 114*a* can secure memory magazine 110*a* within slot 108*a*. In addition, a second locking mechanism 114*b* can secure memory magazine 110*b* within slot 108*b*. Locking mechanisms 114*a/b* can secure memory magazines 110 in place when memory magazines 110 are inserted into slots 108 and are connected to storage appliance 100. While FIG. 1 shows two locking mechanisms corresponding to two slots in housing 102 to receive two memory magazines, housing 102 can include additional slots to receive additional memory magazines, as noted above. Furthermore, while FIG. 1 shows a single locking mechanism corresponding to each slot, housing 102 can include additional locking mechanisms per slot, such as two, three, or four locking mechanisms per slot. Housing 102 can therefore include any number of locking mechanisms in accordance with the number of locking mechanisms per slot and the number of slots within housing 102.

In an embodiment, locking mechanisms 114 can automatically engage when a memory magazine is inserted into one of slots 108. In another embodiment, locking mechanisms 114 can be manually engaged after a memory magazine is inserted into one of slots 108. By way of example and not limitation, locking mechanisms 114 can comprise sliding latches (including spring-loaded sliding latches), slam latches, cam latches, compression cam latches, draw latches, or pin latches.

Figure 7:
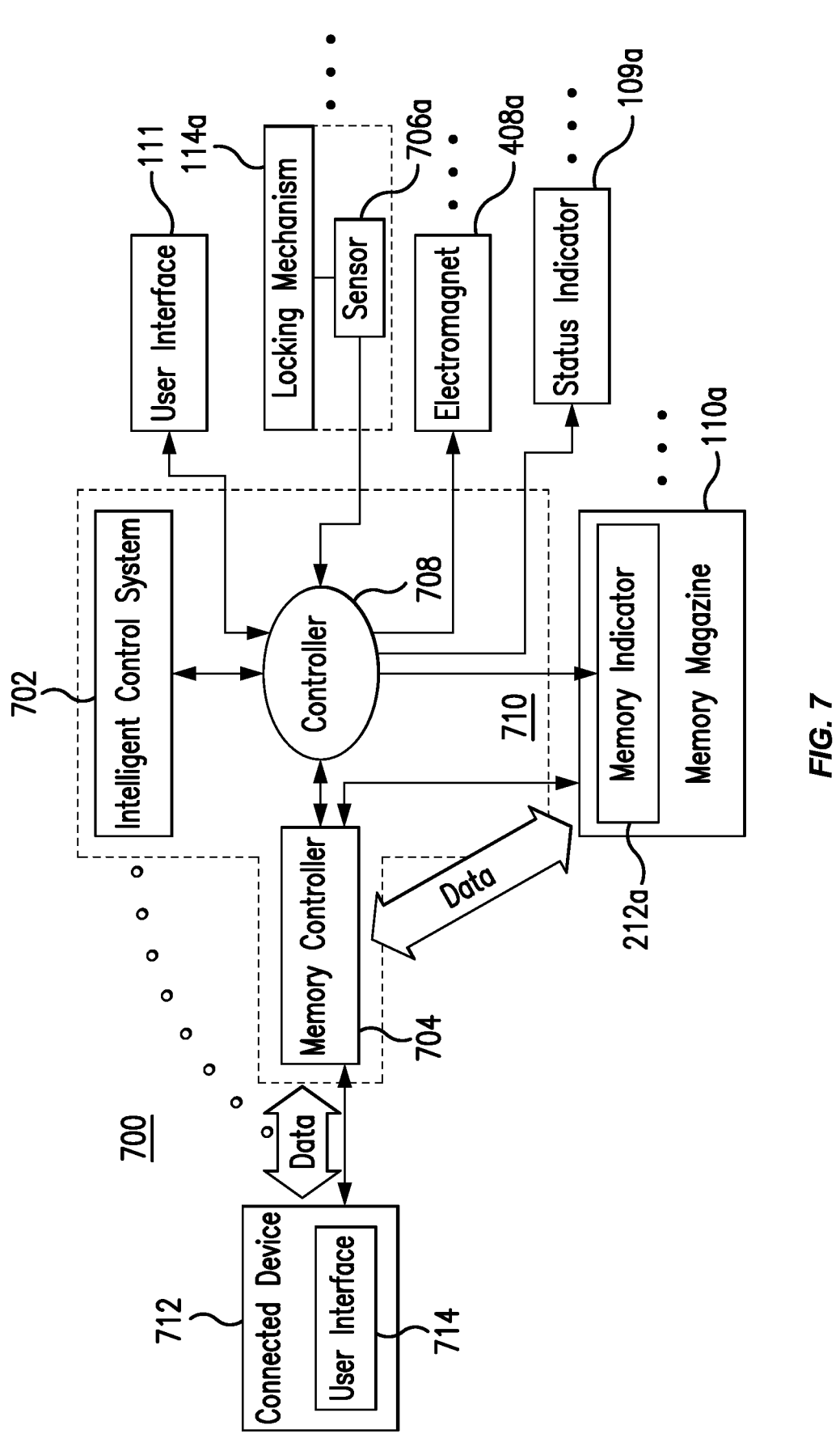
FIG. 7 is a control system in accordance with exemplary aspects of the present disclosure.

Locking mechanisms 114 can be configured to electrically communicate with a controller to control the selection of a memory magazine for data transfer, as described in more detail with respect to FIG. 7. For example, engaging one of locking mechanisms 114 can cause data to be transferred to/from a connected memory magazine secured by the locking mechanism. Conversely, disengaging one of locking mechanisms 114 can cause data to cease to be transferred to/from a connected memory magazine secured by the locking mechanism. For example, memory magazine 110*a* can be inserted into slot 108*a*, causing locking mechanism 114*a* to engage. Engaging locking mechanism 114*a* can cause data to be transferred to/from memory magazine 110*a*. A user can then disengage locking mechanism 114*a*. Disengaging locking mechanism 114*a* can cause data to cease to be transferred to/from memory magazine 110*a*.

Housing 102 can also include a vent 116 to facilitate the flow of air into and out of storage appliance 100. In an embodiment, vent 116 can be a grated vent. While FIG. 1 only shows a single vent on the side of housing 102 proximate to port 104 and user interface 111, housing 102 can include additional vents, for example, a second vent proximate to slots 108. Additionally, housing 102 can include additional vents on other surfaces of housing 102, such as the top surface, bottom surface, or opposite side surface.

Figure 1A:
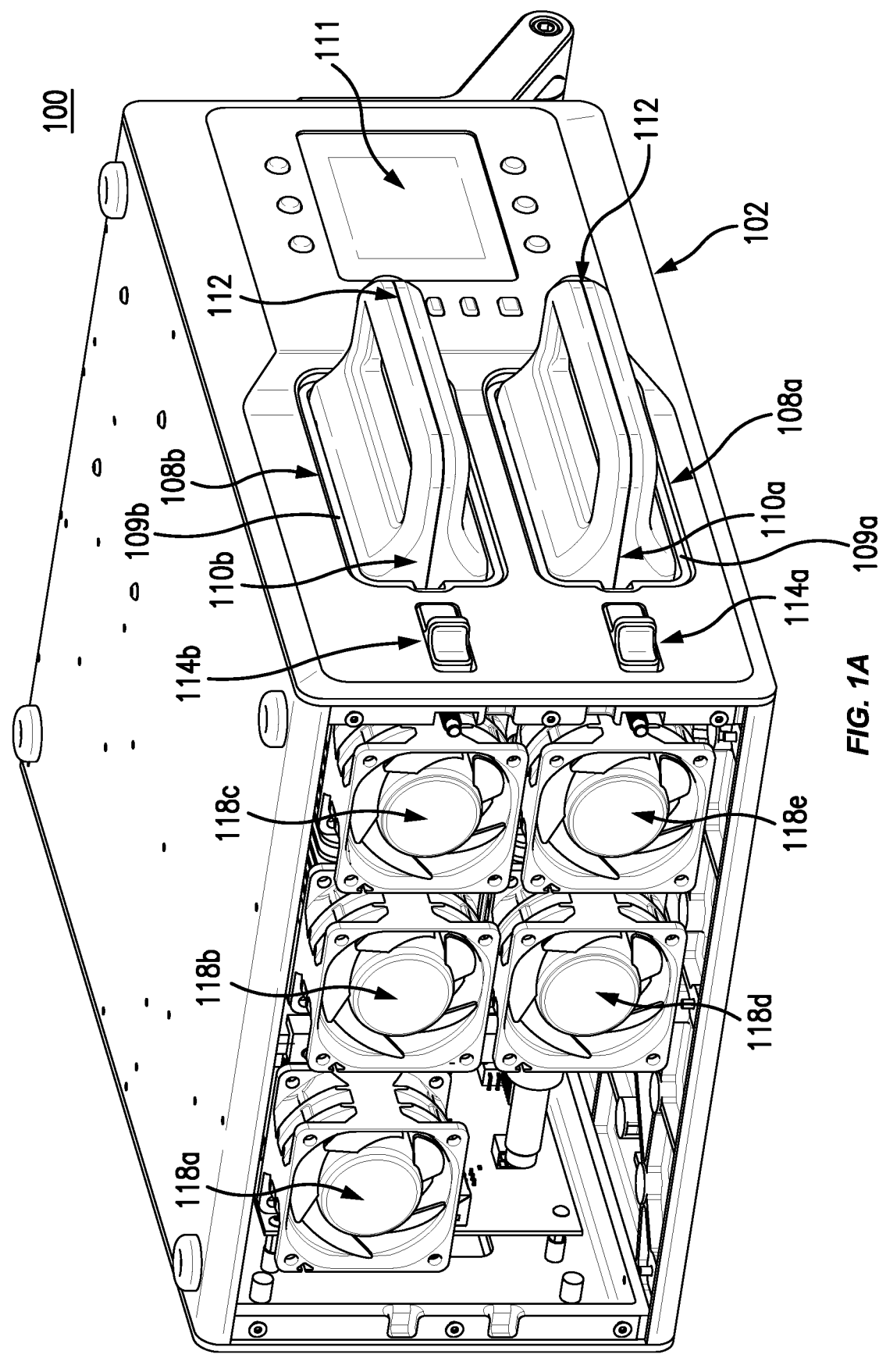
FIG. 1A is a section view of the storage appliance shown in FIG. 1 along line 1A-1A in accordance with exemplary aspects of the present disclosure.

Storage appliance 100 can also include a fan to blow air over memory magazines 110, as shown in FIG. 1A. For example, storage appliance 100 can include fan 118*a*, fan 118*b*, fan 118*c*, fan 118*d*, and fan 118*e* to blow air over memory magazines 110. While FIG. 1A shows five fans, storage appliance 100 can include fewer or additional fans, such as one, two, three, four, six, seven, or eight fans.

Figure 2:
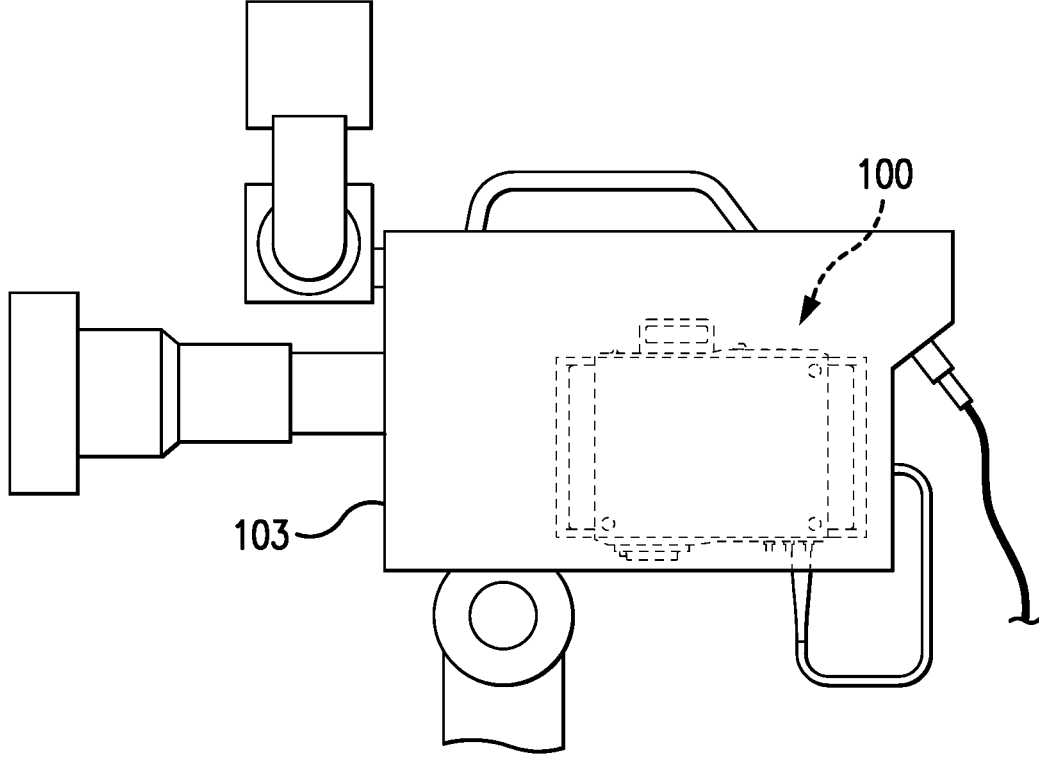
FIG. 2 is a side view of a storage appliance in accordance with exemplary aspects of the present disclosure.

In an embodiment, storage appliance 100 can be a discrete device, as shown in FIGS. 1 and 1A. In another embodiment, storage appliance 100 can be integrated into another device, for example, a camera 103, as shown in FIG. 2.

An example memory magazine 110 is shown in FIG. 3A. Memory magazine 110 can include an example handle 112. Memory magazine 110 can also include a housing 202. In an embodiment, housing 202 can comprise aluminum or an aluminum alloy to protect memory contained within memory magazine 110 from radiation, for example, cosmic rays.

Housing 202 can include heat sink fins 204, such as 204-1 to 204-N. In an embodiment, heat sink fins 204 can extend outward from top and/or bottom surfaces of housing 202. In an embodiment, heat sink fins 204 can comprise twenty-three pairs of heat sink fins 204-1 to 204-23. While FIG. 3A shows twenty-three pairs of heat sink fins (forty-six total heat sink fins), housing 202 can include fewer or additional total heat sink fins, such as thirty, forty, fifty, sixty, or eighty heat sink fins or a number in between.

Heat sink fins 204 can comprise a material of substantial thermal mass, for instance, by way of example and not limitation, aluminum, an aluminum alloy, copper, or polycarbonate. Heat sink fins 204 can comprise a material having a specific heat capacity of about 300 to about 1,300 J/g K. More specifically, heat sink fins 204 can comprise a material having a specific heat capacity of about 400 to about 1,200 J/g K. Even more specifically, heat sink fins 204 can comprise a material having a specific heat capacity of about 800 to about 1,100 J/g K.

Housing 202 can also include cooling holes 206, such as 206-1 to 206-N. In an embodiment, cooling holes 206 can extend from either side of memory magazine 110 through the center of memory magazine 110. Cooling holes 206 can facilitate cooling in the middle of memory magazine 110 by allowing airflow there through. Thus, cooling holes 206 can provide better cooling for the back side of memory arrays 302 positioned near the center of memory magazine 110, as described in more detail below with respect to FIG. 3C. In an embodiment, cooling holes 206 can comprise sixteen cooling holes 206-1 to 206-16. While FIG. 3A shows sixteen cooling holes, housing 202 can include fewer or additional cooling holes, such as twelve, fifteen, eighteen, twenty-one, or twenty-four cooling holes or a number in between.

In an embodiment, the cooling features described above (heat sink fins 204 and cooling holes 206) can be configured to keep housing 202 below a temperature of 60° C. when memory magazine 110 consumes about 48 Watts of power or greater. Further, in an embodiment, the cooling features described above can be configured to keep housing 202 below a temperature of 60° C. when memory modules 306 (shown in FIG. 3D) within memory arrays 302 generate up to about 100 W of heat flow, for example, between about 40 Watts and about 100 W of heat flow. The cooling features can protect memory arrays 302 within memory magazine 110 from overheating and preserve the performance of memory magazine 110, for example, when large amounts of data are being transferred to/from memory magazine 110. As noted above with respect to FIG. 1A, storage appliance 100 can also include fans 118 to blow air over housing 202 of memory magazine 110, particularly over heat sink fins 204 and cooling holes 206, to actively cool memory magazine 110. This can further dissipate heat from memory magazine 110 to protect memory within memory magazine 110 from overheating. In addition to maintaining bandwidth, protection against overheating can prevent the loss or corruption of data due to heat damage.

Memory magazine 110 can include a connector to attach to a complementary connector slot in storage appliance 100, as described in more detail below with respect to FIG. 1B. For example, memory magazine 110 can include a first connector 208a to attach to a complementary connector slot in storage appliance 100. Memory magazine 110 can also include a second connector 208b to attach to a complementary connector slot in storage appliance 100. Connectors 208 can be panel mounted to memory magazine 110. Connectors 208 can be configured to receive power from storage appliance 100 and to transmit/receive data to/from storage appliance 100.

Connectors 208 can be arranged symmetrically so that the attachment of connectors 208 to complementary connector slots within storage appliance 100 can be accomplished in a first or a second connection orientation. For example, memory magazine 110 can be inserted into one of slots 108 and connected to storage appliance 100 in a first connection orientation or in a second connection orientation in which memory magazine 110 has been rotated 180 degrees about its z-axis (as defined in FIG. 3A) from the first connection orientation. While FIG. 3A shows two connectors, memory magazine 110 can include only a single connector or additional connectors, such as four, six, eight, or ten connectors arranged symmetrically about the z-axis. To facilitate the multiple-orientation insertion of memory magazine 110 into one of slots 108, housing 202 can also be symmetric about the z-axis.

Arranging connectors 208 symmetrically about the z-axis and designing housing 202 of a memory magazine 110 to be symmetric about the z-axis are advantageous for a number of reasons. First, these design features prevent a user from inserting memory magazine 110 into one of slots 108 in an incorrect orientation, potentially damaging connectors 208 or the complementary connector slots on storage appliance 100. Additionally, due to the symmetric design of memory magazine 110, a user is not required to ascertain correct orientation prior to insertion of memory magazine 110 into one of slots 108. This allows for faster insertion as data is being stored and/or accessed and memory magazines are being used and changed out on storage appliance 100.

While FIG. 3A shows connectors 208 as female connectors, connectors 208 can be male or female connectors. To maintain the symmetry of connectors 208 about the z-axis of memory magazine 110, connectors 208 must both be male or both be female. In the case of more than two connectors, opposing connectors in pairs of connectors symmetrically arranged about the z-axis must both be male or both be female.

In an embodiment, connectors 208 can be high-speed backplane connectors. For example, connectors 208 can be capable of transmitting data at 56 Gbps or 112 Gbps using Pulse Amplitude Modulation 4-level (PAM4) signal modulation. In an embodiment, connectors 208 can be Samtec ExaMAX® connectors implementing alignment pins or receptacles. In another embodiment, connectors 208 can be Samtec SEARAY™ SEAM connectors.

Figure 1B:
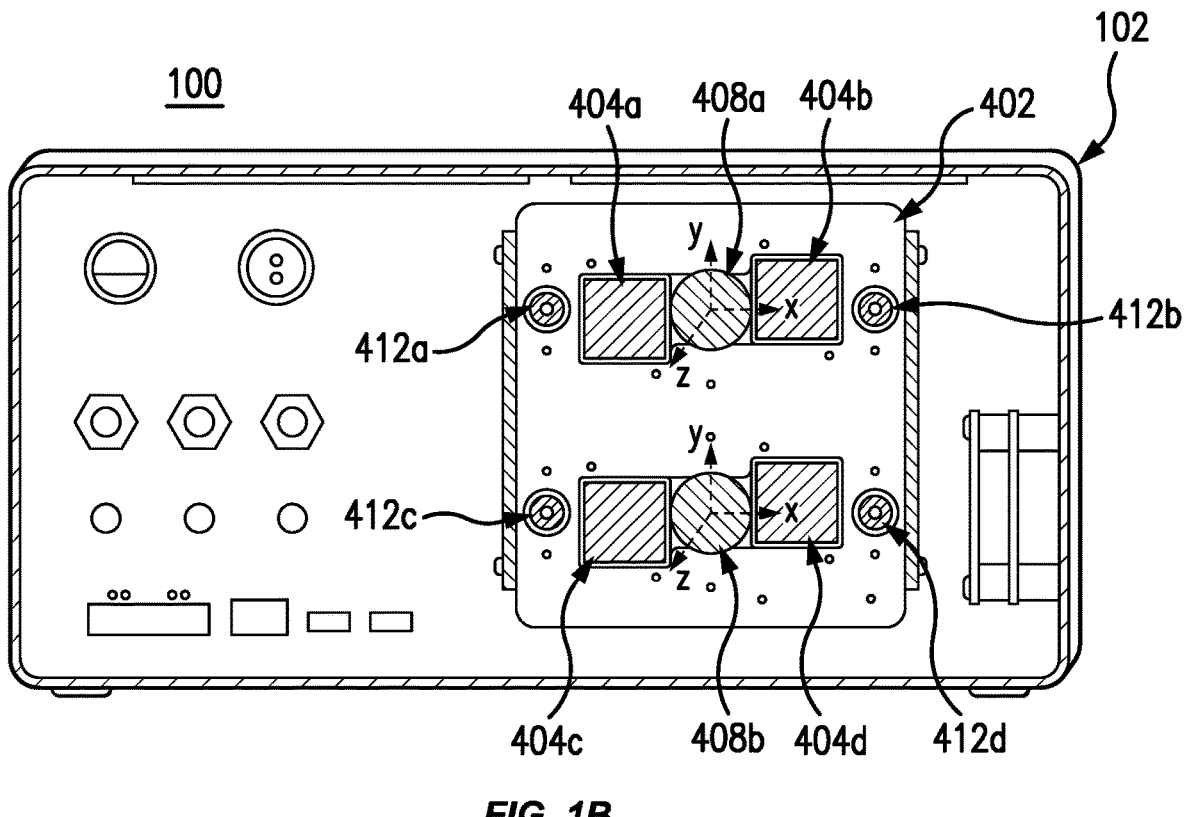
FIG. 1B is a section view of the storage appliance shown in FIG. 1 along line 1B-1B in accordance with exemplary aspects of the present disclosure.

Memory magazine 110 can also include a ferromagnetic plate 210 to attach to an electromagnet in storage appliance 100, as described in more detail with respect to FIG. 1B. Ferromagnetic plate 210 can comprise a ferromagnetic material such as iron, nickel, cobalt, or an alloy or compound including any of these materials. In an embodiment, ferromagnetic plate 210 can be positioned between connectors 208. While FIG. 3A shows a single ferromagnetic plate, memory magazine 110 can include additional ferromagnetic plates to attach to additional electromagnets in storage appliance 100, such as two, three, or four ferromagnetic plates.

FIG. 3B shows an example memory indicator 212 which can be included on handle 112 of memory magazine 110. Memory indicator 212 can show the available memory capacity of memory magazine 110. By way of example and not limitation, memory indicator 212 can comprise an e-ink display or a light or combination of lights (including an LED or combination of LEDs). Memory indicator 212 can describe the available memory capacity of memory magazine 110 within a continuous range (e.g., via a graph and/or percentage), within a segmented range (e.g., empty—quarter full—half full—three quarters full—full), or within a binary range (e.g., not full—full). If memory indicator 212 comprises an e-ink display, it can comprise a black and white e-ink display or a color e-ink display. If memory indicator 212 comprises a color e-ink display, different colors can be used to indicate different levels of available memory capacity (e.g., green—nearly empty, yellow—under half full, red—nearly full). If memory indicator 212 comprises a light or combination of lights, such as an LED or combination of LEDs, different colors can also be used to indicate different levels of available memory (e.g., green—nearly empty, yellow—under half full, red—nearly full). In such a case, memory indicator 212 can comprise a color-changing light, such as a color-changing LED, or it can comprise a multiplicity of single-color lights, such as a multiplicity of single-color LEDs, each of a different color. Memory indicator 212 can also comprise a multiplicity of lights, such as LEDs, of the same or different color arranged and activated sequentially to display a meter that follows changes in available memory capacity. Memory indicator 212 can also comprise a single light, such as an LED, which can indicate available memory capacity binarily (e.g., off—not full, on—full). Memory indicator 212 can be positioned on memory magazine 110 so that it is visible when memory magazine 110 is inserted into one of slots 108 or a case.

A section view of memory magazine 110 is shown in FIG. 3C. Memory magazine 110 can include a memory array 302 for storing data. For example, a memory magazine 110 can include a first memory array 302a and a second memory array 302b. While FIG. 3C shows two memory arrays, memory magazine 110 can include a single memory array or additional memory arrays, such as three, four, five, or six memory arrays. Memory arrays 302 can comprise a number of memory modules. The composition of memory arrays 302 will be discussed in more detail with respect to FIG. 3D.

Memory magazine 110 can also include a thermally conductive pad 304 for quickly transmitting heat from memory arrays 302 into housing 202 and heat sink fins 204. For example, memory magazine 110 can include a first thermally conductive pad 304a, a second thermally conductive pad 304b, a third thermally conductive pad 304c, and a fourth thermally conductive pad 304d. In an embodiment, thermally conductive pads 304a/b can be positioned on each side of memory array 302a. In an embodiment, thermally conductive pads 304c/d can be positioned on each side of memory array 302b. While FIG. 3C shows two thermally conductive pads per memory array, memory magazine 110 can include fewer or additional thermally conductive pads per memory array and fewer or additional memory arrays, as noted above. Therefore, memory magazine 110 can include fewer or additional thermally conductive pads, such as one, two, three, five, six, eight, ten, twelve, or any number of thermally conductive pads in accordance with the number of memory arrays and the number of thermally conductive pads per memory array.

Thermally conductive pads 304 can comprise a low modulus, thermally conductive material. By way of example and not limitation, thermally conductive pads 304 can comprise a polymer, an elastomer, an elastomer composite, or a material with similar properties. Thermally conductive pads 304 can comprise a material having a Young's modulus of about 25 kPa to about 800 kPa. Specifically, thermally conductive pads 304 can comprise a material having a Young's modulus of about 50 kPa to about 400 kPa. Even more specifically, thermally conductive pads 304 can comprise a material having a Young's modulus of about 75 kPa to about 300 kPa. Thermally conductive pads 304 can comprise a material having a thermal conductivity of about 0.8 to about 25 W/m·K. Specifically, thermally conductive pads 304 can comprise a material having a thermal conductivity of about 1.5 to about 15 W/m·K. Even more specifically, thermally conductive pads 304 can comprise a material having a thermal conductivity of about 2.5 to about 10 W/m·K.

As shown in FIG. 3C, cooling holes 206 can provide cooling for the sides of memory arrays 302 that do not face outward toward heat sink fins 204. The presence of cooling holes 206 can increase airflow in the middle of memory magazine 110, allowing heat from memory arrays 302 to dissipate more quickly from the center of memory magazine 110.

As noted above with respect to FIG. 3A, the cooling features of memory magazine 110 (heat sink fins 204, cooling holes 206, and thermally conductive pads 304) can enhance the performance of memory magazine 110 when large amounts of data are being transferred to/from memory magazine 110, thereby ensuring read/write speeds can be maintained. Additionally, protection against overheating prevents the loss and/or corruption of data due to heat damage.

Example components for receiving the example memory magazine 110 into storage appliance 100 and connecting memory magazine 110 to storage appliance 100 are shown in FIG. 1B, which is a section view of storage appliance 100. Storage appliance 100 can include a support plate 402, which can be positioned to abut the components described below for receiving memory magazine 110.

Storage appliance 100 can also include a connector slot 404 to attach to one of connectors 208 of memory magazine 110. For example, storage appliance 100 can include a first connector slot 404a and a second connector slot 404b forming a first pair of connector slots 404a/b to attach to connectors 208 of memory magazine 110. Storage appliance 100 can also include a third connector slot 404c and a fourth connector slot 404d forming a second pair of connector slots 404c/d to attach to connectors 208. In an embodiment, connector slots 404a/b can be positioned within slot 108a to attach to memory magazine 110a. In an embodiment, connector slots 404c/d can positioned in slot 108b to attach to memory magazine 110b. Connector slots 404 can be panel mounted to storage appliance 100. While FIG. 1B shows two connector slots for connection to a single memory magazine, it is understood that the number of connector slots matches the number of connectors on memory magazine 110, such as in the single connector or additional connector cases discussed above with respect to FIG. 3A. Furthermore, while FIG. 1B shows four connector slots corresponding to two slots in housing 102 to receive two memory magazines, housing 102 can include additional slots to receive additional memory magazines, as noted above with respect to FIG. 1. Storage appliance 100 can therefore include additional connector slots, such as six connector slots, eight connector slots, ten connector slots, twelve connector slots, sixteen connector slots, or any number of connector slots in accordance with the number of connectors per memory magazine and the number of slots within housing 102.

Connector slots 404 (or single/additional connector slots) can be arranged symmetrically about the z-axis of each of slots 108 (the z-axes extending vertically upward from support plate 402 through the center of each of slots 108 as shown in FIG. 1B) to correspond to the symmetrical connectors 208 of memory magazine 110. For example, memory magazine 110 can be inserted into one of slots 108 and connected to connector slots 404 independent of the orientation of memory magazine 110.

In an embodiment, each of connector slots 404 can be male or female connectors. However, to maintain the symmetry of connector slots 404 about each of the z-axes of slots 108, connector slots 404a/b must both be male or both be female and connector slots 404c/d must both be male or both be female. In the case of more than two connector slots per slot in housing 102, opposing connector slots in pairs of connector slots arranged symmetrically about each of the z-axes of slots 108 must both be male or both be female.

In an embodiment, connector slots 404 can be high-speed backplane connectors. For example, connector slots 404 can be capable of transmitting data at 56 Gbps or 112 Gbps using Pulse Amplitude Modulation 4-level (PAM4) signal modulation. In an embodiment, connector slots 404 can be Samtec ExaMAX® connectors implementing alignment pins or receptacles. In another embodiment, connector slots 404 can be Samtec SEARAY™ SEAM connectors.

Storage appliance 100 can also include an electromagnet to attach to ferromagnetic plate 210 of memory magazine 110. For example, storage appliance 100 can include a first electromagnet 408a to attach to ferromagnetic plate 210 of memory magazine 110. Storage appliance 100 can also include a second electromagnet 408b to attach to ferromagnetic plate 210 of memory magazine 110. In an embodiment, electromagnet 408a can be positioned in slot 108a to connect to memory magazine 110a. In an embodiment, electromagnet 408b can be positioned in slot 108b to connect to memory magazine 110b. While FIG. 1B shows two electromagnets corresponding to two slots in housing 102 to receive two memory magazines, housing 102 can include additional slots to receive additional memory magazines, as noted above with respect to FIG. 1. Storage appliance 100 can therefore include additional electromagnets, such as three electromagnets, four electromagnets, five electromagnets, six electromagnets, eight electromagnets, nine electromagnets, ten electromagnets, twelve electromagnets, or any number of electromagnets in accordance with the number of ferromagnetic plates per memory magazine and the number of slots within housing 102.

Electromagnets 408a or 408b can be energized when memory magazine 110 is connected to storage appliance 100, engaged within one of slots 108, and data is being transferred to/from memory magazine 110. Further, a respective electromagnet 408a or 408b can switch off when data ceases to be transferred to/from the respective memory magazine 110. Electromagnet 408 can be configured to respond to a signal generated if data has begun to be or has ceased to be transferred to/from memory magazine 110, turning on if data has begun to be transferred to/from memory magazine 110 and turning off if data has ceased to be transferred to/from memory magazine 110.

Data beginning to be transferred to/from memory magazine 110 can be prompted by a number of conditions. By way of example and not limitation, these conditions can include: 1) a user inserting memory magazine 110 into one of slots 108, thereby engaging locking mechanism 114; 2) a user initiating a command via user interface 111 to transfer data to/from memory magazine 110; 3) another memory magazine connected to storage appliance 100 running out of storage capacity or unread data; 4) an intelligent control system selecting memory magazine 110 for data transfer; or 5) a user initiating via a user interface on a connected device a command to transfer data to/from storage appliance 100.

Stoppage of data transfer to/from memory magazine 110 can be prompted by a number of conditions. By way of example and not limitation, these conditions can include: 1) a user disengaging locking mechanism 114; 2) a user initiating an eject command via user interface 111; 3) memory magazine 110 running out of storage capacity or unread data; 4) an intelligent control system deselecting memory magazine 110 for data transfer; or 5) a user initiating via a user interface on a connected device a command to cease transferring data to/from storage appliance 100. Electromagnets 408 can also switch off if storage appliance 100 loses power, ensuring that memory magazine 110 is not trapped in storage appliance 100.

The electrical coupling of electromagnets 408 with various components enabling the above functions will be described in more detail with respect to FIG. 7.

The use of an electromagnet to secure memory magazine 110 in storage appliance 100 can prevent a user from accidentally removing memory magazine 110 while data is being transferred to/from memory magazine 110. This can prevent the corruption and/or loss of data caused by a premature disconnection of memory magazine 110 from storage appliance 100.

Storage appliance 100 can also include a spring 412. For example, storage appliance 100 can include a first spring 412a and a second spring 412b forming a first pair of springs 412a/b to contact memory magazine 110. Storage appliance 100 can also include a third spring 412c and a fourth spring 412d forming a second pair of springs 412c/d to contact memory magazine 110. In an embodiment, springs 412a/b can be positioned in slot 108a to exert a force against memory magazine 110a upward along its z-axis when it is inserted into slot 108a. In an embodiment, springs 412c/d can be positioned in slot 108b to exert a force against memory magazine 110b upward along its z-axis when it is inserted into slot 108b. While FIG. 1B shows four springs corresponding to two slots in housing 102 to receive two memory magazines, storage appliance 100 can include additional slots to receive additional memory magazines, as noted above with respect to FIG. 1. Furthermore, while FIG. 1B shows two springs corresponding to each slot, storage appliance 100 can include a single spring or additional springs per slot, such as three, four, five or six springs per slot. Storage appliance 100 can therefore include any number of springs in accordance with the number of springs per slot and the number of slots within housing 102.

Springs 412 can assist with ejecting memory magazine 110 when data has ceased to be transferred to/from memory magazine 110 and the corresponding locking mechanism of locking mechanisms 114 has been disengaged. Further, springs 412 can decelerate memory magazine 110 when it is being inserted into one of slots 108, thereby preventing damage to connectors 208, ferromagnetic plate 210, connector slots 404, and electromagnet 408a or 408b caused by a user slamming memory magazine 110 into the bottom of one of slots 108.

A section view of memory magazine 110 depicting memory arrays 302 in more detail is shown in FIG. 3D. As discussed above with respect to FIG. 3C, memory magazine 110 can include a first memory array 302a and a second memory array 302b. Memory arrays 302 can comprise memory modules 306, such as 306-1 to 306-N. In an embodiment, memory arrays 302 can each comprise six memory modules 306-1 to 306-6. While FIG. 3D depicts six memory modules per memory array 302, each of memory arrays 302 can include fewer memory modules or additional memory modules, such as two, four, eight, ten, twelve, fourteen, or sixteen memory modules or any number in between. In an embodiment, memory modules 306 can each store at least a terabyte of data. For example, memory modules 306 can each store at least two terabytes of data, at least four terabytes of data, at least six terabytes of data, or at least eight terabytes of data.

In an embodiment, memory modules 306 can comprise non-volatile solid state drive (SSD) memory. In an embodiment, memory modules 306 can comprise NAND flash memory that is single-level cell (SLC) flash memory, multi-level cell (MLC) flash memory, triple-level cell (TLC) flash memory, quad-level cell (QLC) flash memory, or flash memory including higher levels of memory cells for storing and/or accessing data. To increase bandwidth, data can be striped across multiple memory modules 306 as it is being stored.

In an embodiment, memory modules 306 can comprise Non-Volatile Memory Express (NVMe) SSDs. In an embodiment, memory modules 306 can comprise Next Generation Form Factor (M.2) cards. Memory modules 306 can comprise M.2 cards of size 2280, of size 22110, or of another size suitable for high-capacity storage.

In an embodiment, memory modules 306 can comprise Peripheral Component Interconnect Express (PCIe)-based SSDs. Memory modules 306 can comprise PCIe 3.0 (or greater)-based SSDs. For example, memory modules 306 can comprise PCIe 4.0-based SSDs, PCIe 5.0-based SSDs, or SSDs designed for subsequent generations of PCIe interfaces.

In an implementation, the data stored on memory modules 306 can be visual data captured by a camera. Such data can be in raw ("mosaic") format. Raw data, as opposed to processed ("demosaiced") data, maintains all of the original data captured by a camera's image sensor and color filter array (CFA). When a CFA, such as a Bayer filter, captures color data, it often can capture data on the intensity of light in only one of three wavelength ranges (for instance, red, green, or blue) per pixel. This data can then be stored with no or minimal processing. In comparison, demosaiced data has been mathematically processed to generate interpreted RGB values for each pixel based on the single-color data of neighboring pixels as captured by the CFA. The demosaicing process, usually performed onboard a camera, can be used to create a full color image ready to be displayed. However, in the demosaicing process, data obtained by the image sensor and CFA is lost (i.e., a camera or processing device usually discards some of the raw data in producing the demosaiced data). Raw data cannot be displayed without further processing, yet maintaining raw data can provide at least two major benefits: 1) Raw data can provide enhanced creative control over a resulting image, since all data originally recorded is available for manipulation; and 2) Raw data can result in higher-quality images, since more of the original data is maintained. It is therefore often desirable to maintain raw data to enhance creative control (resulting in more finely-tuned images) and to achieve higher-resolution images. This is particularly important in environments where displayed media covers a large portion of an observer's field of view.

One drawback to maintaining raw data is its size compared to other data formats. For the same image or video, raw data can be over an order of magnitude larger than other standard formats for image or video data. In order to mitigate file size concerns, raw data can be compressed in either lossy or lossless format. Lossless compression can be implemented when high image quality is a priority. Lossy compression can be implemented when high image quality is less of a priority, for example when maintaining backup data.

To best manage storage of a high volume of data (particularly raw data) in real time and the duplication of that data, the memory components of memory magazines 110 can be variably designed and implemented across storage appliance 100.

In an embodiment, memory modules 306 can comprise MLC, TLC, QLC, or flash memory including higher levels of memory cells for storing and/or accessing data. In a first case, memory modules 306 can comprise TLC flash memory and can be configured to store data on only a first cell level. For example, controllers within each memory module 306 can run a custom firmware which ensures only the first level of memory is used. Storing data on only a first cell level is advantageous for maintaining fast read/write speeds, since bits of data can be stored on and accessed from the first cell level of TLC flash memory more quickly than bits of data can be stored on and accessed from higher levels. This first case can be implemented when fast read/write speeds are desirable, for example when recording live media and storing recorded raw data in real time. Enhanced bandwidth can ensure the highest-quality data possible (for example, uncompressed raw data) can be stored and accessed.

In a second case, memory modules 306 can comprise TLC flash memory and can be configured to store data on cell levels beyond the first cell level. Storing data on and accessing data from higher cell levels is advantageous for high-capacity storage, since more data can be stored within each memory cell. However, read/write speeds can be reduced compared to the first case since storing bits of data on and accessing bits of data from higher cell levels can take longer than storing bits of data on and accessing bits of data from the first level. This second case can be implemented when high-capacity storage is desirable and read/write speeds are not as primary a concern. A bandwidth lower than that of the first case can be sufficient for storing and accessing either unique or duplicate lower-quality data (for example, demosaiced data) in real time and duplicating previously recorded data (either as compressed or uncompressed raw data or demosaiced data).

In an embodiment, memory magazine 110a can comprise low-capacity, high-bandwidth TLC flash memory and can be configured to store data on only a first cell level. Configuring memory magazine 110a in this manner can reduce its capacity but can maximize transfer speeds. Since memory magazine 110a can maintain read/write speeds comparable to the high data-rates necessary for storing recorded data for later high-resolution display, memory magazine 110a can contribute to a higher level of data fidelity. For the reasons described above, this can be particularly useful when the data being stored is raw data. The higher data rates caused by the transfer of raw data, particularly uncompressed raw data, to memory magazine 110a (e.g., 30 GB/second or higher) require quicker read/write speeds, making the above embodiment advantageous for high-data-rate storage In an embodiment, memory magazine 110b can comprise high-capacity, lower-bandwidth TLC flash memory and can be configured to store data on higher cell levels. While configuring memory magazine 110b this way reduces read/write speeds when data is recorded on cell levels beyond the first cell level, it can maximize the amount of data capable of being stored on memory magazine 110b. Memory magazine 110b can therefore be used for storing large amounts of lower-quality data, such as compressed raw data or demosaiced data stored in real time, and duplicating previously recorded data (either at a lower or the same quality as the originally recorded data).

The selection of memory magazines 110a and 110b for data storage (i.e., the selection of the location of storage) and the selection of the format in which data is stored can be managed by an intelligent control system, as discussed below with respect to FIG. 7.

A common concern when storing data is the fault tolerance of the storage. Damage to a data storage device and/or corruption of data can lead to the complete loss of data if a data storage system is not fault tolerant. Duplicating data according to well-known redundant array of independent disks (RAID) methods can mitigate concerns about losing data. However, practical constraints involved in the manufacture and use of data storage devices must be balanced with the need to maintain backup data in the case of a storage failure.

When recording high volumes of data, duplicating data for backup en masse can be an inefficient use of data storage resources. Some data can be "more important" than other data. For example, data that will be displayed in the center region of an observer's field of view can be considered "more important" than data that will be displayed at the periphery of an observer's field of view. Other considerations can be used to determine which data is "more important." Conventional RAID methods may duplicate data that is not critical to the eventual display or use of a high-quality collection of data. In the use of conventional RAID methods, valuable memory capacity and bandwidth that could have been reserved for "more important" data can therefore be lost.

The intelligent control system discussed with respect to FIG. 7 can analyze data being stored and determine which data is "more important." The intelligent control system can then make decisions on whether to duplicate all data in demosaiced format, duplicate only the "more important" data in raw format, or duplicate only the "more important" data in demosaiced format. The intelligent control system can make these decisions based on available bandwidth and memory capacity across data storage devices and choose where to store the duplicated data.

For example, in an implementation, the intelligent control system can identify a subset of the data being stored on memory magazine 110a as "more important." The intelligent control system can then identify memory magazine 110b as a data storage device with available bandwidth and memory capacity. The intelligent control system can choose to store the "more important" data on memory magazine 110b in either raw or demosaiced format. Conversely, the intelligent control system can choose to store all data being recorded on memory magazine 110a on memory magazine 110b in demosaiced format, rather than just the "more important" data.

Decisions made by the intelligent control system can affect the operation of electromagnets 408. For example, in an implementation, the intelligent control system selecting memory magazine 110b for the storage of data can cause data to be transferred to memory magazine 110b. Upon data transfer to memory magazine 110b initiating, electromagnet 408b can engage according to the process described below with respect to FIG. 7. When electromagnet 408b engages, a user cannot disconnect memory magazine 110b from storage appliance 100 and remove memory magazine 110b from slot 108b. Conversely, the intelligent control system deselecting memory magazine 110b for further data storage can cause data to cease to be transferred to memory magazine 110b. Upon data transfer to memory magazine 110b ceasing, electromagnet 408b can disengage. A user can now disconnect memory magazine 110b from storage appliance 100 and remove memory magazine 110b from slot 108b.

Figure 4A:
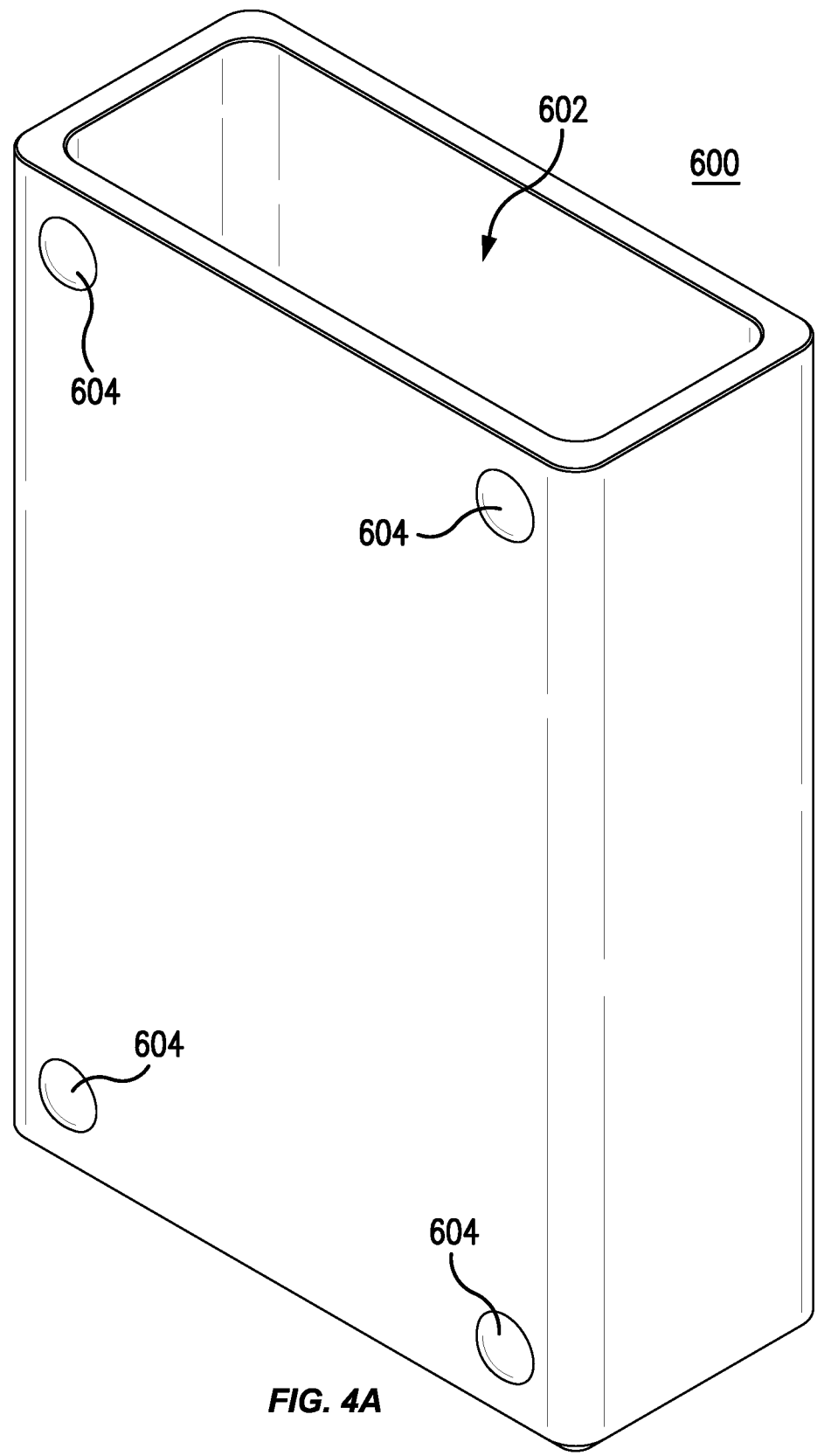
FIGS. 4A-4C are orthographic views of a case in accordance with exemplary aspects of the present disclosure.
Figure 4B:
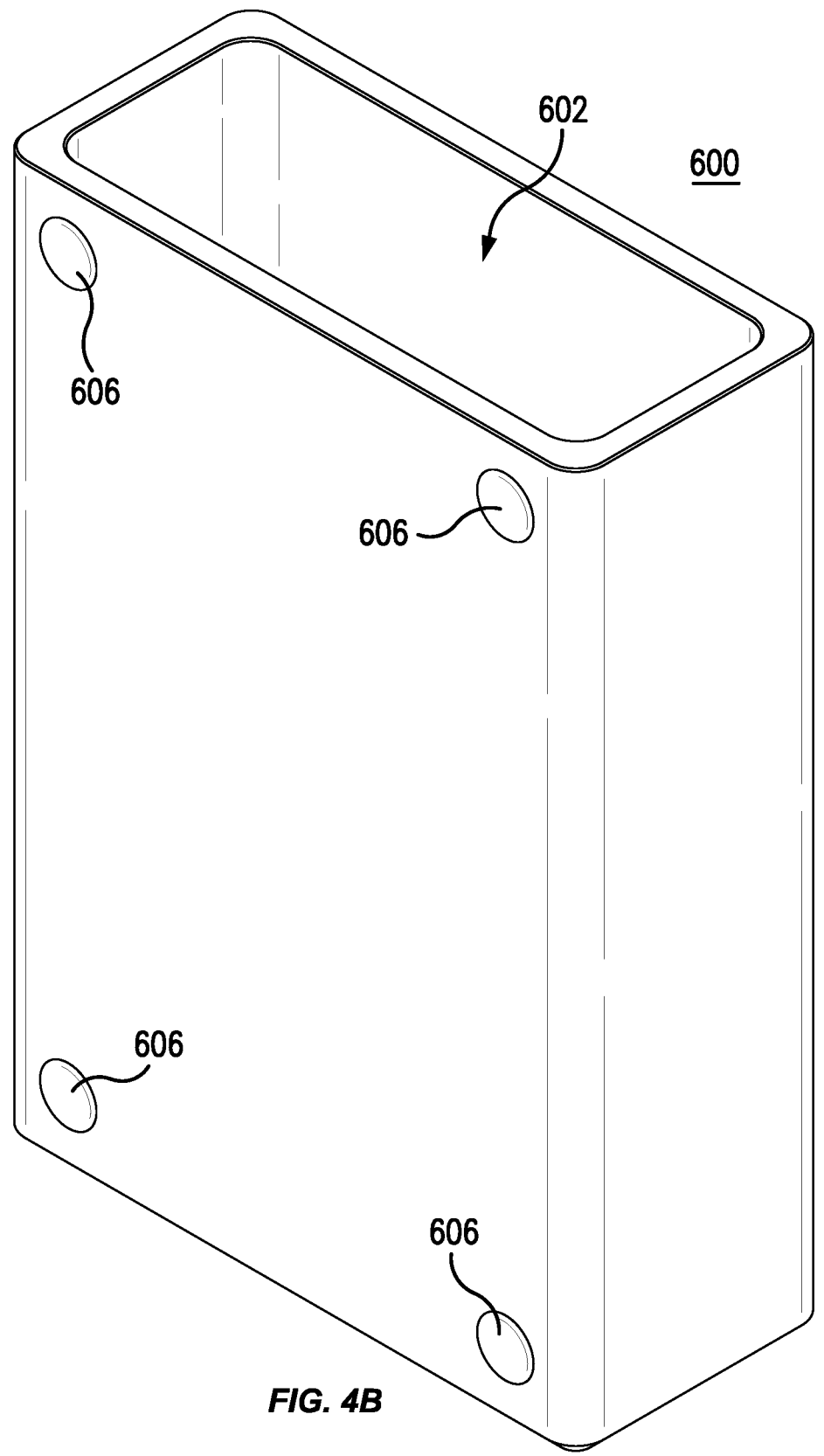
Figure 4C:
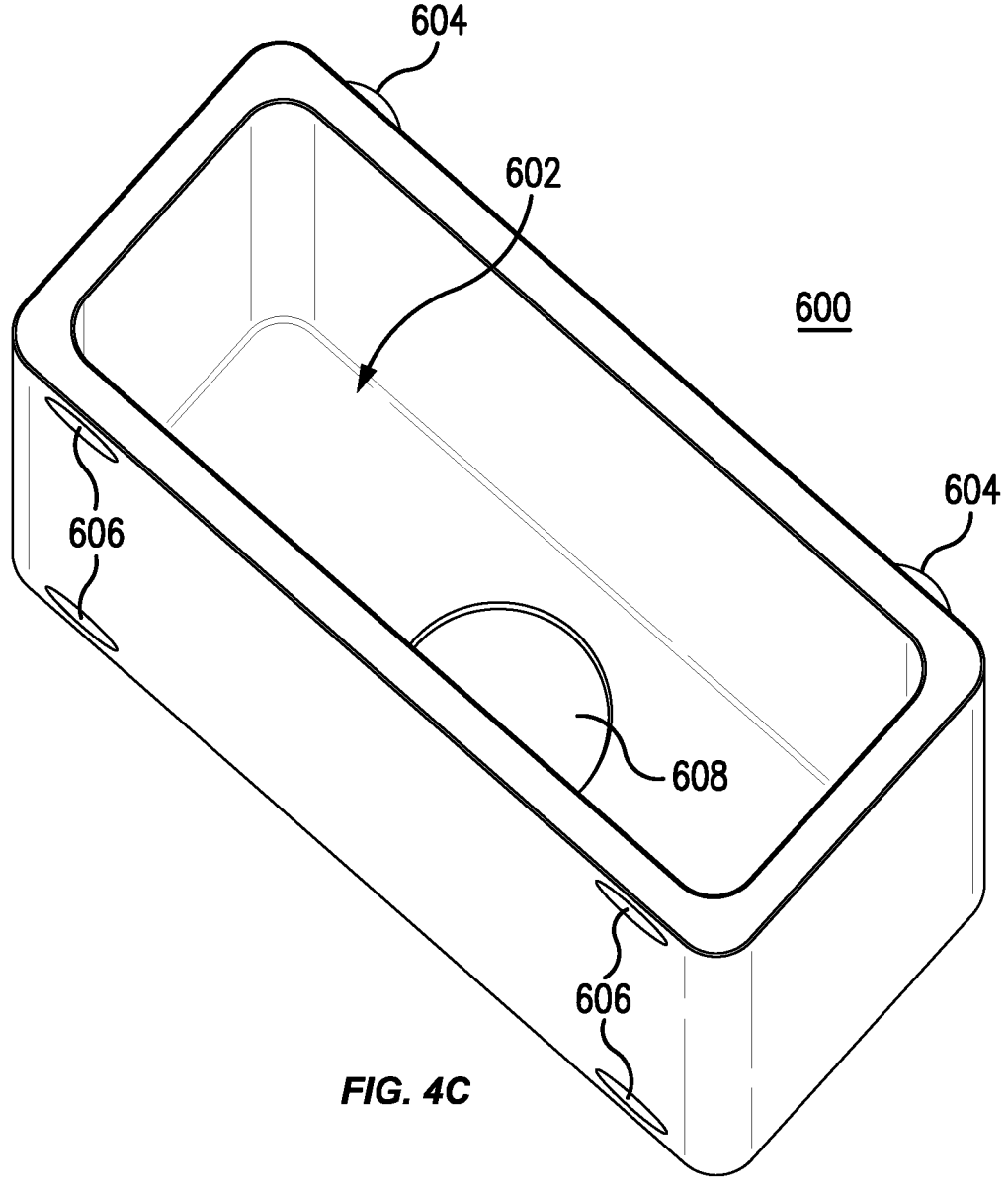

An example case 600 for storing memory magazine 110 is shown in FIGS. 4A-4C. Case 600 can include a cavity 602 to receive memory magazine 110. Case 600 can also include protrusions 604, as shown in FIG. 4A, to removably couple case 600 to another case. For example, case 600 can include four protrusions 604 to insert into complementary hollows on another case. While FIG. 4A shows four protrusions 604, case 600 can include fewer or additional protrusions in accordance with the number of complementary hollows on other cases. Furthermore, while FIG. 4A shows spherical cap protrusions, protrusions 604 can comprise other shapes, such as cylinders, elevated ovals, elevated rectangles, or any other shape in accordance with the shape of complementary hollows on other cases.

Case 600 can also include hollows 606, as shown in FIG. 4B, to removably couple case 600 to another case. While FIG. 4B shows four hollows 606, case 600 can include fewer or additional hollows in accordance with the number of complementary protrusions on other cases. Furthermore, while FIG. 4B shows indented spherical cap hollows, hollows 606 can comprise other shapes, such as indented circles, ovals, rectangles, or any other shape in accordance with the shape of complementary protrusions on other cases.

Protrusions 604 and hollows 606 can ensure that memory magazines stored in a number of cases 600 can be stably stacked.

Case 600 can include a magnet 608, as shown in FIG. 4C, to attach to ferromagnetic plate 210 of memory magazine 110. Magnet 608 can be positioned inside cavity 602. Magnet 608 can secure memory magazine 110 in place when memory magazine 110 is stored in case 600. While FIG. 4C shows only one magnet, case 600 can include additional magnets in accordance with the number of ferromagnetic plates on memory magazine 110.

Figure 5:
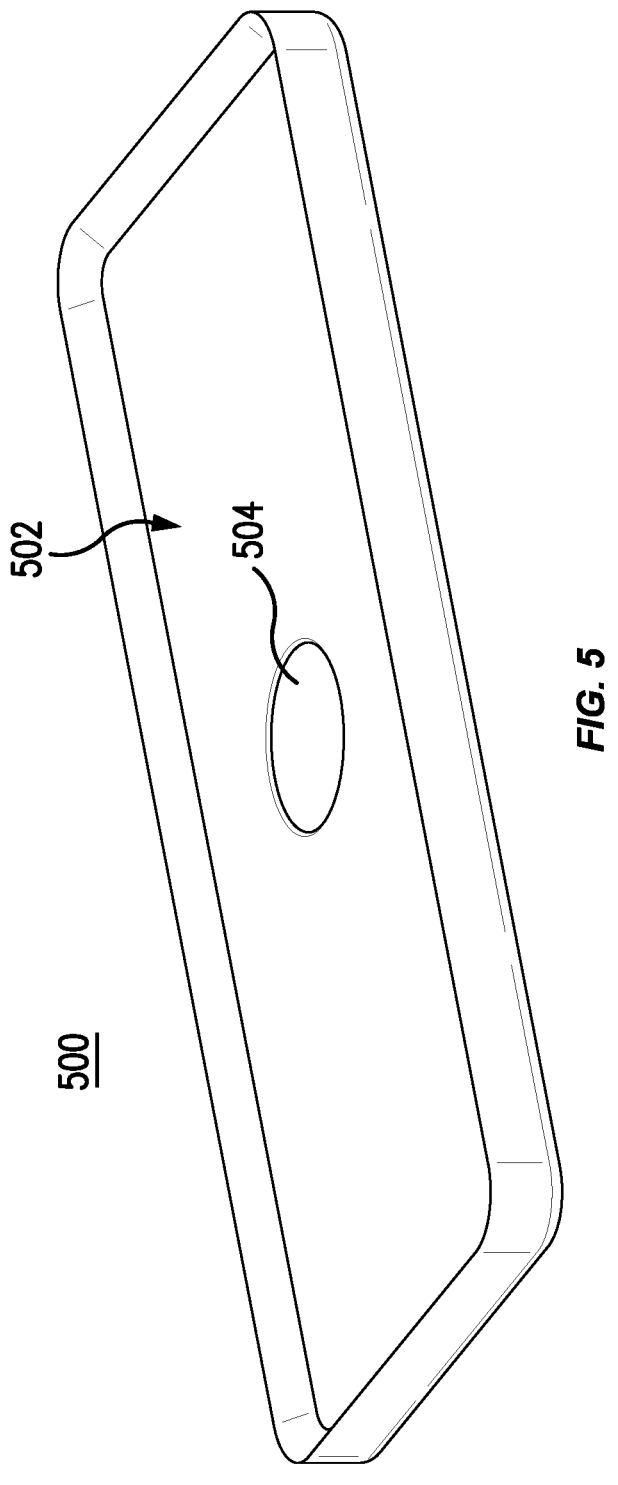
FIG. 5 is an orthographic view of a cap for use with the case shown in FIGS. 4A-4C in accordance with exemplary aspects of the present disclosure.

A cap 500 configured to removably attach to case 600 is shown in FIG. 5. Cap 500 can include a cavity 502 whose shape can conform to the bottom of case 600. Cap 500 can also include a magnet 504 to removably couple to magnet 608 of case 600 when cavity 502 faces the bottom of case 600. Cap 500 can be color-coded to identify the state of a memory magazine 110 stored within case 600 (e.g., green—unused, red—full).

Figure 6:
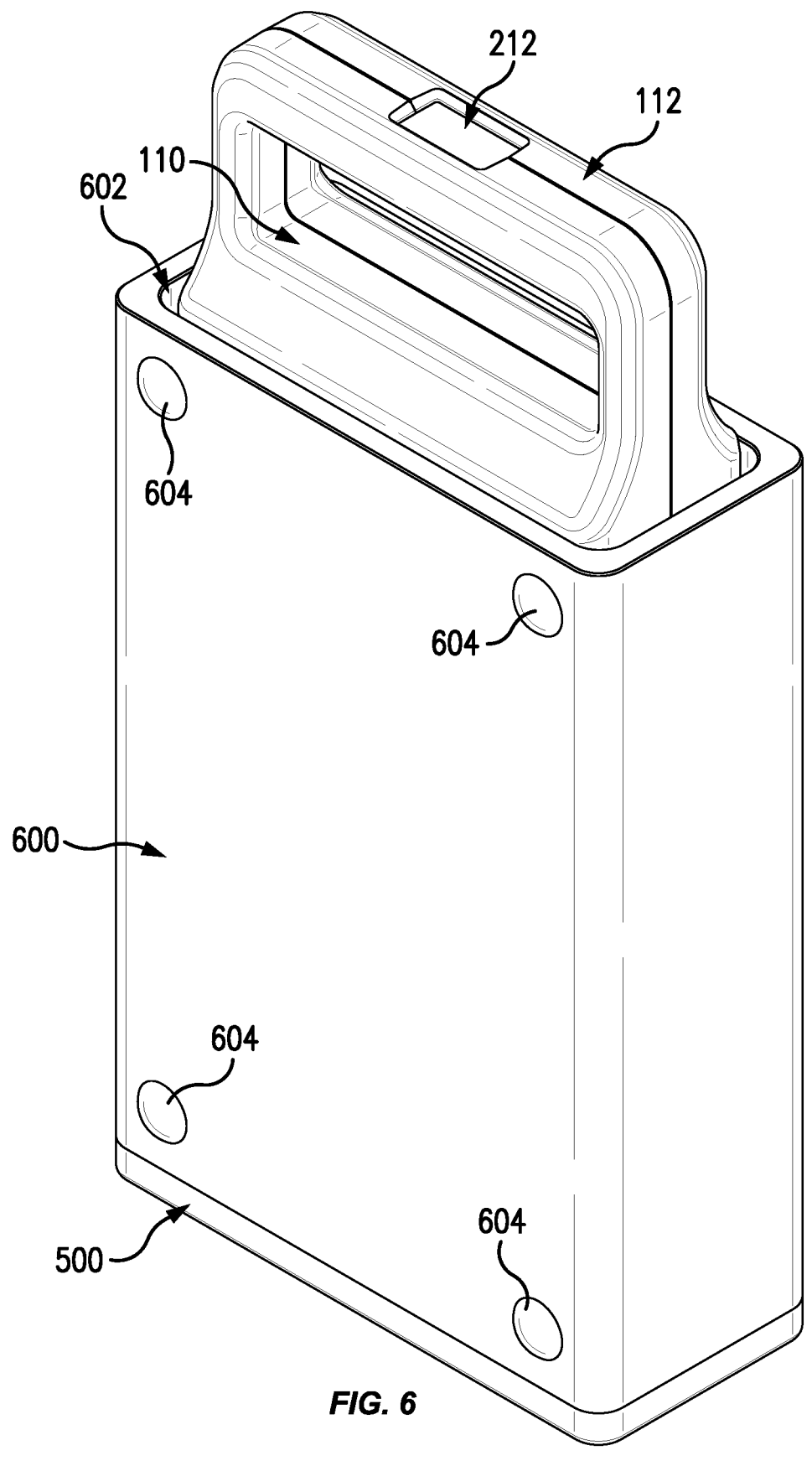
FIG. 6 is an orthographic view of an assembly of the memory magazine shown in FIGS. 3A-3B, the case shown in FIGS. 4A-4C, and the cap shown in FIG. 5 in accordance with exemplary aspects of the present disclosure.

The complete assembly of memory magazine 110, case 600, and cap 500 is shown in FIG. 6. Memory magazine 110 can be inserted into cavity 602 of case 600, and cap 500 can be attached to indicate the state of memory magazine 110.

An example system 700 for controlling various components within the storage appliance/memory magazine system is shown in FIG. 7. System 700 can include status indicators 109, memory magazines 110, user interface 111, locking mechanisms 114, memory indicators 212, and electromagnets 408. Furthermore, system 700 can include an intelligent control system 702 such as that discussed above and a memory controller 704. Memory controller 704 can manage the transfer of data to/from memory magazines 110. In addition, memory controller 704 can ascertain whether a reliable connection has been established between a memory magazine 110 and memory controller 704, the available bandwidth of each of memory magazines 110, the available memory capacity of each of memory magazines 110, the fraction of stored data read from each of memory magazines 110, and the status of data transfer to/from each of memory magazines 110. Memory controller 704 can send this information to other components within system 700.

System 700 can also include sensors 706. Sensors 706 can be communicatively coupled to locking mechanisms 114 to detect the status of locking mechanisms 114 (i.e., engaged or disengaged). For example, locking mechanism 114a can be communicatively coupled to sensor 706a. Sensor 706a can be housed within locking mechanism 114a entirely, partly within locking mechanism 114 and partly within housing 102 of storage appliance 100, or within housing 102 of storage appliance 100. Additional locking mechanisms 114 can be communicatively coupled to additional sensors 706b, 706c, 706d, etc.

Sensors 706 can comprise switches, including spring-loaded switches. By way of example and not limitation, sensors 706 can comprise toggle switches, selector switches, pushbutton switches, limit switches, or proximity switches (including optical switches). Sensors 706 can be configured to send an electrical signal whenever one of locking mechanisms 114 changes from a disengaged position to an engaged position. Sensors 706 can also be configured to send an electrical signal whenever one of locking mechanisms 114 changes from an engaged position to a disengaged position.

System 700 can also include a controller 708 electrically coupled to status indicators 109, user interface 111, memory indicators 212, electromagnets 408, intelligent control system 702, memory controller 704, and sensors 706. While FIG. 7 shows intelligent control system 702, memory controller 704, and controller 708 as distinct entities, it is also shown that intelligent control system 702, memory controller 704, and controller 708 can be incorporated into one another, and/or their tasks can be consolidated to perform a particular function, such that an integrated control system 710 can be formed. Integrated control system 710 can consist of any combination of intelligent control system 702, memory controller 704, and controller 708. Further, intelligent control system 702, memory controller 704, and/or controller 708 can be housed in storage appliance 100, a connected device 712, or a combination of storage appliance 100 and connected device 712.

System 700 can also include connected device 712. In an implementation, connected device 712 can be a camera. In another implementation, connected device 712 can be a computer or other device for processing data. In another implementation, connected device 712 can be a device for displaying visual and/or audio data. Connected device 712 can include a user interface 714. Employing user interface 714, a user can initiate or end the transfer of data to/from storage appliance 100.

As discussed above with respect to FIG. 3B, a memory magazine can include a memory indicator 212. For example, memory magazine 110a can include memory indicator 212a. Additional memory magazines 110 can include additional memory indicators 212b, 212c, 212d, etc.

The arrangement of components within system 700 as shown in FIG. 7 is not intended to limit the makeup of system 700 or the relationships that can exist between components in system 700. Fewer or additional components, and alternative pathways of communication between components, can be implemented to perform the below functions or execute any other purpose in line with the present disclosure.

For each of the example functions of system 700 described below, it is understood that status indicator 109a, memory magazine 110a, locking mechanism 114a, memory indicator 212a, electromagnet 408a, and sensor 706a are referenced to provide an example of each of the functions performed. However, the functions can be performed with any set of status indicator, memory magazine, locking mechanism, memory indicator, electromagnet, and sensor associated with a memory magazine 110 connected to storage appliance 100. Additionally, the functions can be performed on any such set individually or in combination with other sets of status indicators, memory magazines, locking mechanisms, memory indicators, electromagnets, and sensors associated with memory magazines 110 connected to storage appliance 100.

The functions described below are intended to be exemplary functions, and do not preclude system 700 performing additional functions not listed or described.

1) Control of Electromagnets 408 Via Locking Mechanisms 114

Locking mechanism 114a can be engaged by a user. In an embodiment, locking mechanism 114a can be engaged automatically by a user inserting memory magazine 110a into slot 108a. In another embodiment, locking mechanism 114a can be engaged manually by a user after memory magazine 110a is inserted into slot 108a.

Locking mechanism 114a being engaged can cause sensor 706a to register the engagement of locking mechanism 114a. Sensor 706a can send a signal to controller 708 indicating that locking mechanism 114a has been engaged. Controller 708 can send a signal to memory controller 704 instructing memory controller 704 to begin transferring data to/from memory magazine 110a. Once the transfer of data to/from memory magazine 110a has been initiated, memory controller 704 can send a signal to controller 708 indicating data is being transferred to/from memory magazine 110a. Controller 708 can then send a signal to electromagnet 408a instructing electromagnet 408a to turn on.

Locking mechanism 114a can be disengaged manually by a user. Locking mechanism 114a being disengaged can cause sensor 706a to register the disengagement of locking mechanism 114a. Sensor 706a can send a signal to controller 708 indicating that locking mechanism 114a has been disengaged. Controller 708 can send a signal to memory controller 704 instructing memory controller 704 to end the transfer of data to/from memory magazine 110a. Once the transfer of data to/from memory magazine 110a has ceased, memory controller 704 can send a signal to controller 708 indicating data is no longer being transferred to/from memory magazine 110a. Controller 708 can then send a signal to electromagnet 408a instructing electromagnet 408a to turn off.

2) Control of Electromagnets 408 Via User Interface 111

User interface 111 can receive information from sensor 706a and memory controller 704 on which of slots 108 hold connected memory magazines, the available memory capacity of each connected memory magazine, the fraction of stored data read from each connected memory magazine, and/or the status of data transfer to/from each connected memory magazine. This information can be sent through controller 708. User interface 111 can display indications of this information. For example, user interface 111 can display that slot 108a is occupied by a connected memory magazine, for example memory magazine 110a, and that memory magazine 110a has a certain level of available memory capacity and/or fraction of stored data yet to be read. User interface 111 can also display whether data is being transferred to/from memory magazine 110a.

A user can select memory magazine 110a for data reading/writing via user interface 111. User interface 111 can send a signal to controller 708 instructing controller 708 to initiate transfer of data to/from memory magazine 110a. Controller 708 can send a signal to memory controller 704 instructing memory controller 704 to begin transferring data to/from memory magazine 110a. Once the transfer of data to/from memory magazine 110a has been initiated, memory controller 704 can send a signal to controller 708 indicating data is being transferred to/from memory magazine 110a. Controller 708 can then send a signal to electromagnet 408a instructing electromagnet 408a to turn on.

A user can eject memory magazine 110a via user interface 111, causing data transfer to/from memory magazine 110a to cease. User interface 111 can send a signal to controller 708 instructing controller 708 to end transfer of data to/from memory magazine 110a. Controller 708 can send a signal to memory controller 704 instructing memory controller 704 to end the transfer of data to/from memory magazine 110a. Once the transfer of data to/from memory magazine 110a has ceased, memory controller 704 can send a signal to controller 708 indicating data is no longer being transferred to/from memory magazine 110a. Controller 708 can then send a signal to electromagnet 408a instructing electromagnet 408a to turn off.

3) Control of Electromagnets 408 Via Memory Magazine 110

When data is being written to memory magazine 110a, memory magazine 110a can reach a state in which its available memory capacity has been expended. If the available memory capacity of memory magazine 110a is expended, memory controller 704 can end the writing of data to memory magazine 110a. Once the transfer of data to/from memory magazine 110a has ceased, memory controller 704 can send a signal to controller 708 indicating data is no longer being transferred to/from memory magazine 110a. Controller 708 can then send a signal to electromagnet 408a instructing electromagnet 408a to turn off.

When data is being read from memory magazine 110a, memory magazine 110a can reach a state in which all stored data has been read. If all stored data of memory magazine 110a has been read, memory controller 704 can end the reading of data from memory magazine 110a. Once the transfer of data to/from memory magazine 110a has ceased, memory controller 704 can send a signal to controller 708 indicating data is no longer being transferred to/from memory magazine 110a. Controller 708 can then send a signal to electromagnet 408a instructing electromagnet 408a to turn off.

Data transfer to/from memory magazine 110a can also be initiated based on the above conditions being met for another memory magazine connected to storage appliance 100, for example memory magazine 110b. Once memory magazine 110b has run out of available storage capacity or unread data and the transfer of data to/from memory magazine 110b has ceased, memory controller 704 can send a signal to controller 708 indicating data is no longer being transferred to/from memory magazine 110b. Controller 708 can send a signal to memory controller 704 instructing memory controller 704 to initiate data transfer to/from memory magazine 110*a*. Once the transfer of data to/from memory magazine 110*a* has been initiated, memory controller 704 can send a signal to controller 708 indicating data is being transferred to/from memory magazine 110*a*. Controller 708 can then send a signal to electromagnet 408*a* instructing electromagnet 408*a* to turn on.

4) Control of Electromagnets 408 Via Intelligent Control System 702

Intelligent control system 702 can receive information from sensor 706*a* and memory controller 704 on which of slots 108 hold connected memory magazines, the available bandwidth of each of the connected memory magazines, and the available memory capacity of each of the connected memory magazines. This information can be sent through controller 708. For example, intelligent control system 702 can receive information that slot 108*a* is occupied by a memory magazine, for example memory magazine 110*a*, and that memory magazine 110*a* has certain levels of available bandwidth and memory capacity.

Intelligent control system 702 is also in communication with data being transferred to/from connected device 712, as illustrated in FIG. 7. This allows intelligent control system 702 to analyze which data is "more important," as discussed above with respect to FIG. 3D.

Based on factors such as the amount of "more important" data, the available bandwidth and memory capacity of memory magazine 110*a*, and/or the available bandwidth and memory capacity across memory magazines connected to storage appliance 100, intelligent control system 702 can select memory magazine 110*a* for data storage. Intelligent control system 702 can send a signal to controller 708 instructing controller 708 to initiate transfer of data to/from memory magazine 110*a*. Controller 708 can send a signal to memory controller 704 instructing memory controller 704 to begin transferring data to/from memory magazine 110*a*. Once the transfer of data to/from memory magazine 110*a* has been initiated, memory controller 704 can send a signal to controller 708 indicating data is being transferred to/from memory magazine 110*a*. Controller 708 can then send a signal to electromagnet 408*a* instructing electromagnet 408*a* to turn on.

Based on factors such as those mentioned directly above, intelligent control system 702 can also deselect magazine 110*a* for data storage. Intelligent control system 702 can send a signal to controller 708 instructing controller 708 to end transfer of data to/from memory magazine 110*a*. Controller 708 can send a signal to memory controller 704 instructing memory controller 704 to end the transfer of data to/from memory magazine 110*a*. Once the transfer of data to/from memory magazine 110*a* has ceased, memory controller 704 can send a signal to controller 708 indicating data is no longer being transferred to/from memory magazine 110*a*. Controller 708 can then send a signal to electromagnet 408*a* instructing electromagnet 408*a* to turn off.

5) Control of Electromagnets 408 Via User Interface 714

Memory magazine 110*a* can be prepared for data reading/writing based on the conditions discussed above (engagement of locking mechanism 114*a*, a user selecting memory magazine 110*a* for data transfer via user inter interface 111, another connected memory magazine, such as memory magazine 110*b*, becoming fully utilized, and/or intelligent control system 702 selecting memory magazine 110*a* for data storage). However, in some cases, data may not actually be transferred to/from memory magazine 110*a* until a user initiates a command via user interface 714 of connected device 712 to transfer data to/from storage appliance 100. In some implementations, the command can be a record or play command. Similarly, if data is being transferred to/from memory magazine 110*a*, a user can cause data to cease to be transferred to/from memory magazine 110*a* by initiating a command via user interface 714 of connected device 712 to end the transfer of data to/from storage appliance 100. In some implementations, the command can be a stop recording or stop command.

A user can initiate transfer of data to/from storage appliance 100 via a command on user interface 714 of connected device 712. Connected device 712 can send a signal to memory controller 704 instructing memory controller 704 to initiate data transfer to/from connected device 712. Memory controller 704 can initiate data transfer between connected device 712 and memory magazine 110*a* (already prepared for data reading/writing). Once the transfer of data to/from memory magazine 110*a* has been initiated, memory controller 704 can send a signal to controller 708 indicating data is being transferred to/from memory magazine 110*a*. Controller 708 can then send a signal to electromagnet 408*a* instructing electromagnet 408*a* to turn on.

A user can cause the transfer of data to/from storage appliance 100 to cease via a command on user interface 714 of connected device 712. Connected device 712 can send a signal to memory controller 704 instructing memory controller 704 to end the transfer of data to/from connected device 712. Memory controller 704 can end the transfer of data between connected device 712 and memory magazine 110*a* (already being utilized for data reading/writing). Once the transfer of data to/from memory magazine 110*a* has ceased, memory controller 704 can send a signal to controller 708 indicating data has ceased to be transferred to/from memory magazine 110*a*. Controller 708 can then send a signal to electromagnet 408*a* instructing electromagnet 408*a* to turn off.

6) Control of Status Indicators 109 Via Memory Controller 704 and Controller 708

Memory controller 704 and controller 708 can obtain information determining the status of memory magazine 110*a*. For example, controller 708 can receive information on whether locking mechanism 114*a* is engaged and can turn on electromagnet 408*a* accordingly. Controller 708 can then use the status of locking mechanism 114*a* and electromagnet 408*a*, along with a signal received from memory controller 704 indicating whether a reliable connection between memory magazine 110*a* and memory controller 704 has been established, to determine whether memory magazine 110*a* is connected and ready for data transfer. In addition, memory controller 704 can ascertain the status of memory magazine 110*a* directly. For example, memory controller 704 can ascertain that data is being recorded to, read from, or formatted on memory magazine 110*a* since it is the primary component managing these tasks. For the same reason, memory controller 704 can ascertain if an error has occurred in recording, reading, or formatting data. Memory controller 704 can then send information on the status of memory magazine 110*a* to controller 708.

Controller 708 can send a signal to status indicator 109*a* instructing status indicator 109*a* to display the status of memory magazine 110*a*. Status indicator 109*a* can display the status of memory magazine 110*a* according to the embodiments of status indicator 109*a* discussed above with respect to FIG. 1.

23

7) Control of Memory Indicators 212 Via Memory Controller 704

Memory controller 704 can send a signal indicating the available memory capacity of memory magazine 110*a* to controller 708. Controller 708 can send a signal to memory indicator 212*a* instructing memory indicator 212*a* to display the available memory capacity of memory magazine 110*a*. Memory indicator 212*a* can display the available memory capacity of memory magazine 110*a* according to the embodiments of memory indicator 212 discussed above with respect to FIG. 3B.

CONCLUSION

The Detailed Description referred to accompanying figures to illustrate exemplary embodiments consistent with the disclosure. References in the disclosure to an exemplary embodiment indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. The breadth and scope of the present invention should not be limited by any of the above-described exemplary embodiments, but should be defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software application, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM), random access memory (RAM), magnetic disk storage media, optical storage media, flash memory devices, and others. As another example, the machine-readable medium can include transitory machine-readable medium such as electrical, optical, acoustical, or other forms of propagated signals (e.g., carrier waves, infrared signals, digital signals, etc.). Further, firmware, software application, routines, and instructions can be described herein as performing certain actions. However, it should be appreciated that such descriptions are merely for convenience and that such actions in fact result from computing devices, processors, controllers, or other devices executing the firmware, software application, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A device for electronic data storage, the device comprising:
a data storage magazine comprising:
a plurality of symmetrical data storage magazine connectors,
a ferromagnetic material, and
a memory; and
a storage appliance comprising:
a housing,
a cavity in the housing to receive the data storage magazine,
a plurality of symmetrical storage appliance connectors to detachably couple to the plurality of symmetrical data storage magazine connectors, and
an electromagnet to detachably couple to the ferromagnetic material.

2. The device of claim 1, the data storage magazine further comprising one of or any combination of the following elements: a second housing that comprises a material with substantial thermal mass, a low modulus thermally conductive material, a plurality of holes, or a protrusion for a user gripping the data storage magazine.

3. The device of claim 2, the storage appliance further comprising a fan to blow air over a finned housing of the data storage magazine.

4. The device of claim 1, the storage appliance further comprising a support plate positioned on the storage appliance to abut at least one of the plurality of storage appliance connectors, the electromagnet, or a spring.

5. The device of claim 1, the storage appliance further comprising a mechanical locking mechanism to secure the data storage magazine to the storage appliance in a connected configuration.

6. The device of claim 1, wherein the storage appliance is a distinct structure in communication with a camera or other device.

7. The device of claim 1, wherein the storage appliance is integrated into a camera housing.

8. The device of claim 1, further comprising a case to receive the data storage magazine, the case comprising a magnet to detachably couple to the ferromagnetic material.

9. The device of claim 1, wherein the plurality of symmetrical data storage magazine connectors are arranged symmetrically about an axis of the data storage magazine corresponding to a direction of insertion into the storage appliance to allow connection of the data storage magazine to the storage appliance in a plurality of orientations.

10. A data storage magazine, comprising:

a memory;

a data storage magazine connector to engage with a complementary external connector; and a ferromagnetic material to engage with a complementary electromagnetic locking mechanism, the complementary electromagnetic locking mechanism being configured to:

switch on in response to a first signal generated when data begins to be transferred to/from the data storage magazine, and switch off in response to a second signal generated when data ceases to be transferred to/from the data storage magazine.

11. The data storage magazine of claim 10, further comprising one of or any combination of the following elements: a low modulus thermally conductive material, a plurality of holes, or a protrusion for a user gripping the data storage magazine.

12. The data storage magazine of claim 11, wherein the low modulus thermally conductive material is positioned adjacent to the memory.

13. The data storage magazine of claim 10, the memory comprising:

a first layer associated with first data read and write speeds, a second layer associated with second data read and write speeds slower than the first data read and write speeds of the first layer, and a third layer associated with third data read and write speeds slower than the second data read and write speeds of the second layer.

14. The data storage magazine of claim 13, wherein the data storage magazine is a high-speed data storage magazine that only stores data on the first layer.

15. The data storage magazine of claim 13, wherein the data storage magazine is a high-capacity data storage magazine that stores data on the first, second, and third layers.

16. The data storage magazine of claim 10, further comprising an indicator of available capacity of the memory.

17. A method for electronically storing and accessing data, the method comprising:

connecting a data storage magazine comprising memory to a storage appliance via a plurality of symmetrical data storage magazine connectors detachably coupled to a plurality of symmetrical storage appliance connectors, securing the data storage magazine to the storage appliance in a connected configuration using an electromagnetic locking mechanism engaged when data is being transferred to/from the data storage magazine, switching on the electromagnetic locking mechanism in response to a first signal generated when data begins to be transferred to/from the data storage magazine, and switching off the electromagnetic locking mechanism in response to a second signal generated when data ceases to be transferred to/from the data storage magazine.

18. The method of claim 17, further comprising removing the data storage magazine from the connected configuration is assisted by with assistance from a spring.

19. The method of claim 17, further comprising actively cooling the data storage magazines by a fan.

20. The method of claim 17, further comprising:

connecting a plurality of data storage magazines comprising a plurality of memories to the storage appliance, and transferring data to/from a single data storage magazine of the plurality of data storage magazines individually or a combination of data storage magazines of the plurality of data storage magazines simultaneously.

21. The method of claim 20, wherein the memory of a first data storage magazine of the plurality of data storage magazines comprises:

a first layer associated with first data read and write speeds, a second layer associated with second data read and write speeds slower than the first data read and write speeds of the first layer, and a third layer associated with third data read and write speeds slower than the second data read and write speeds of the second layer, and wherein the first data storage magazine only stores data on the first layer.

22. The method of claim 21, wherein the memory of a second data storage magazine of the plurality of data storage magazines comprises:

a fourth layer associated with fourth data read and write speeds, a fifth layer associated with fifth data read and write speeds slower than the fourth data read and write speeds of the fourth layer, and a sixth layer associated with sixth data read and write speeds slower than the fifth data read and write speeds of the fifth layer, and wherein the second data storage magazine stores data on the fourth, fifth, and sixth layers.

23. The method of claim 17, wherein the plurality of symmetrical data storage magazine connectors are arranged symmetrically about an axis of the data storage magazine corresponding to a direction of connection to the storage appliance to allow connection of the data storage magazine to the storage appliance in a plurality of orientations.

* * * * *